March 22, 1966 R. A. HEISLER 3,241,578

APPARATUS FOR PROVIDING BAILS ON CANS

Filed Sept. 12, 1962 17 Sheets-Sheet 1

INVENTOR.
RAYMOND A. HEISLER
BY Robert Irving Williams
ATTORNEY

March 22, 1966 R. A. HEISLER 3,241,578

APPARATUS FOR PROVIDING BAILS ON CANS

Filed Sept. 12, 1962 17 Sheets-Sheet 2

INVENTOR.
RAYMOND A. HEISLER
BY Robert Irving Williams
ATTORNEY

APPARATUS FOR PROVIDING BAILS ON CANS

Filed Sept. 12, 1962 17 Sheets-Sheet 3

INVENTOR.
RAYMOND A. HEISLER
BY Robert Irving Williams
ATTORNEY

March 22, 1966 R. A. HEISLER 3,241,578

APPARATUS FOR PROVIDING BAILS ON CANS

Filed Sept. 12, 1962 17 Sheets-Sheet 4

INVENTOR.
RAYMOND A. HEISLER
BY Robert Irving Williams
ATTORNEY

INVENTOR.
RAYMOND A. HEISLER
BY Robert Irving Williams
ATTORNEY

APPARATUS FOR PROVIDING BAILS ON CANS

Filed Sept. 12, 1962 17 Sheets-Sheet 6

INVENTOR.
RAYMOND A. HEISLER
BY Robert Irving Williams
ATTORNEY

March 22, 1966 R. A. HEISLER 3,241,578

APPARATUS FOR PROVIDING BAILS ON CANS

Filed Sept. 12, 1962 17 Sheets-Sheet 7

INVENTOR.
RAYMOND A. HEISLER
BY Robert Irving Williams
ATTORNEY

INVENTOR.
RAYMOND A. HEISLER
BY Robert Irving Williams
ATTORNEY

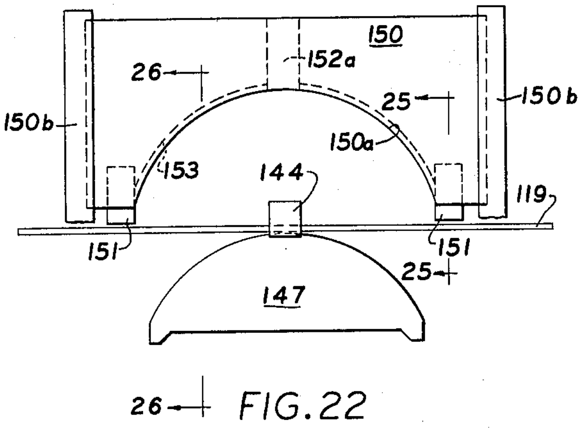
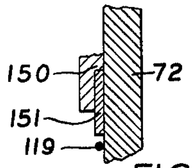
FIG. 25
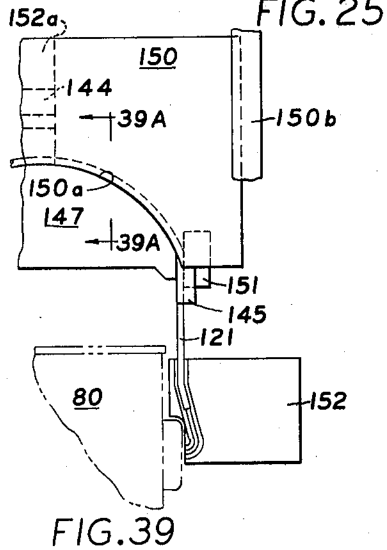
FIG. 39
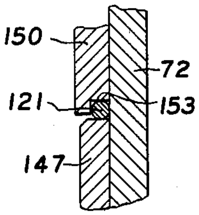
FIG. 39A
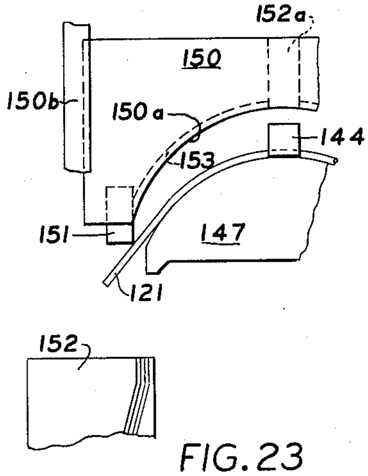
FIG. 23
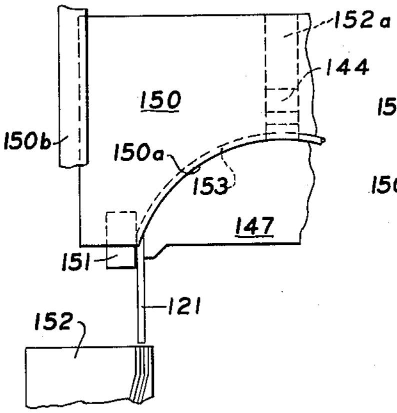
FIG. 24
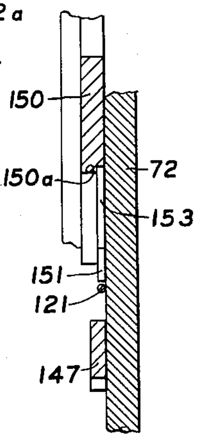
FIG. 26
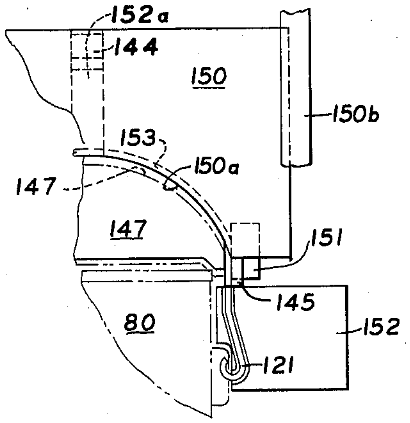
FIG. 40
INVENTOR.
RAYMOND A. HEISLER
BY Robert Irving Williams
ATTORNEY

APPARATUS FOR PROVIDING BAILS ON CANS

Filed Sept. 12, 1962 17 Sheets-Sheet 10

INVENTOR.
RAYMOND A. HEISLER
BY Robert Irving Williams
ATTORNEY

INVENTOR.
RAYMOND A. HEISLER
BY Robert Irving Williams
ATTORNEY

INVENTOR.
RAYMOND A. HEISLER
BY Robert Irving Williams
ATTORNEY

March 22, 1966 R. A. HEISLER 3,241,578

APPARATUS FOR PROVIDING BAILS ON CANS

Filed Sept. 12, 1962 17 Sheets-Sheet 13

INVENTOR.
RAYMOND A. HEISLER
BY Robert Irving Williams
ATTORNEY

March 22, 1966 R. A. HEISLER 3,241,578

APPARATUS FOR PROVIDING BAILS ON CANS

Filed Sept. 12, 1962 17 Sheets-Sheet 14

INVENTOR.
RAYMOND A. HEISLER
BY Robert Irving Williams
ATTORNEY

APPARATUS FOR PROVIDING BAILS ON CANS

Filed Sept. 12, 1962 17 Sheets-Sheet 15

INVENTOR.
RAYMOND A. HEISLER
BY Robert Irving Williams
ATTORNEY

INVENTOR.
RAYMOND A. HEISLER
BY Robert Irving Williams
ATTORNEY

INVENTOR.
RAYMOND A. HEISLER
BY Robert Irving Williams
ATTORNEY

United States Patent Office 3,241,578

Patented Mar. 22, 1966

3,241,578
APPARATUS FOR PROVIDING BAILS ON CANS

Raymond A. Heisler, Wayne, N.J., assignor to The Heisler Company, Caldwell, N.J.

Filed Sept. 12, 1962, Ser. No. 223,015
24 Claims. (Cl. 140—93)

This invention relates to improvements in apparatus for and processes of providing containers with bails, and, more specifically providing eared cans with wire bails.

Initially bails were made in a cumbersome and inefficient manner in which the ends of a precut and performed bail, were bent in such a manner as to permit hand assembly. As the use of eared cans increased so also did the importance of providing a bail that could be economically manufactured and inserted. Apparatus for the high speed production of bails designed to be inserted by hand has been accomplished, but such bails not only require hand labor with attaching apparatus but also require the use of a bail relatively easy to dislodge or disengage from the can.

With the foregoing and other considerations in mind the present invention contemplates an effective and efficient selection and orientation of eared cans and the automatic formation of a bail and the effective and efficient insertion of the ends of the bail into the ears of such cans.

Pursuant to the invention in various of its aspects there is provided apparatus arranged to receive cans from a delivery source, and providing means at a feeding station to space such cans upon a conveying means, means to regulate the flow of said cans in a steady even manner and to orient these cans in such a manner that cans with two properly placed ears are detected for the insertion of bails, those cans with ears missing being rejected and passed through the apparatus without activating the bail making mechanism; apparatus arranged to transport and control the can without contacting the side of the can upon which a fresh label may have been placed; apparatus that will receive a signal and, pursuant thereto, cause the apparatus to form a bail and/or insert bail ends into the ears of a can; apparatus that will take wire from a storage source, feed the wire, and, if necessary, cut it to a predetermined length, shape the wire, and fasten the wire in the form of a bail to the ears of the can in a simple and effective manner.

In certain of its aspects the invention contemplates the provision of a by-pass conveyor system for passing smaller cans through the apparatus without activating the bail making mechanism.

In certain other of its aspects the invention contemplates the provision of simple and effective means for providing cans with bails which is adaptable to either manual or automatic operation.

An important advantage of the invention in its various aspects is that it enables the attachment of bails to cans in such a manner that it is virtually impossible to accidentally remove or dislodge the bail from the can.

The invention accordingly comprises apparatus embodying the features of construction, combination of elements, and arrangements of parts, and the several steps and the relation and order of one or more of such steps with respect to each of the others, all as exemplified in the following detailed disclosure the scope of the application of which being indicated in the claims.

Further objects and advantages of this invention will become apparent as the description of a preferred embodiment proceeds in connection with the accompanying drawings, wherein:

FIG. 22 is a fragmentary front view showing the wire at the moment of transfer;

FIG. 23 is a fragmentary front view showing the wire being formed into a U;

FIG. 24 is a fragmentary front view showing the relative position of the upper and lower die shoes after forming the U;

FIG. 25 is a cross section of the contact blocks on the line 25—25 of FIG. 22;

FIG. 26 is a cross section of upper and lower dies on the line 26—26 of FIG. 22;

FIG. 39 is a fragmentary front view showing the bail entering the curling die;

FIG. 39A is a section on the line 39A—39A of FIG39;

FIG. 40 is fragmentary front view showing the bail formed and inserted;

Figure 1:
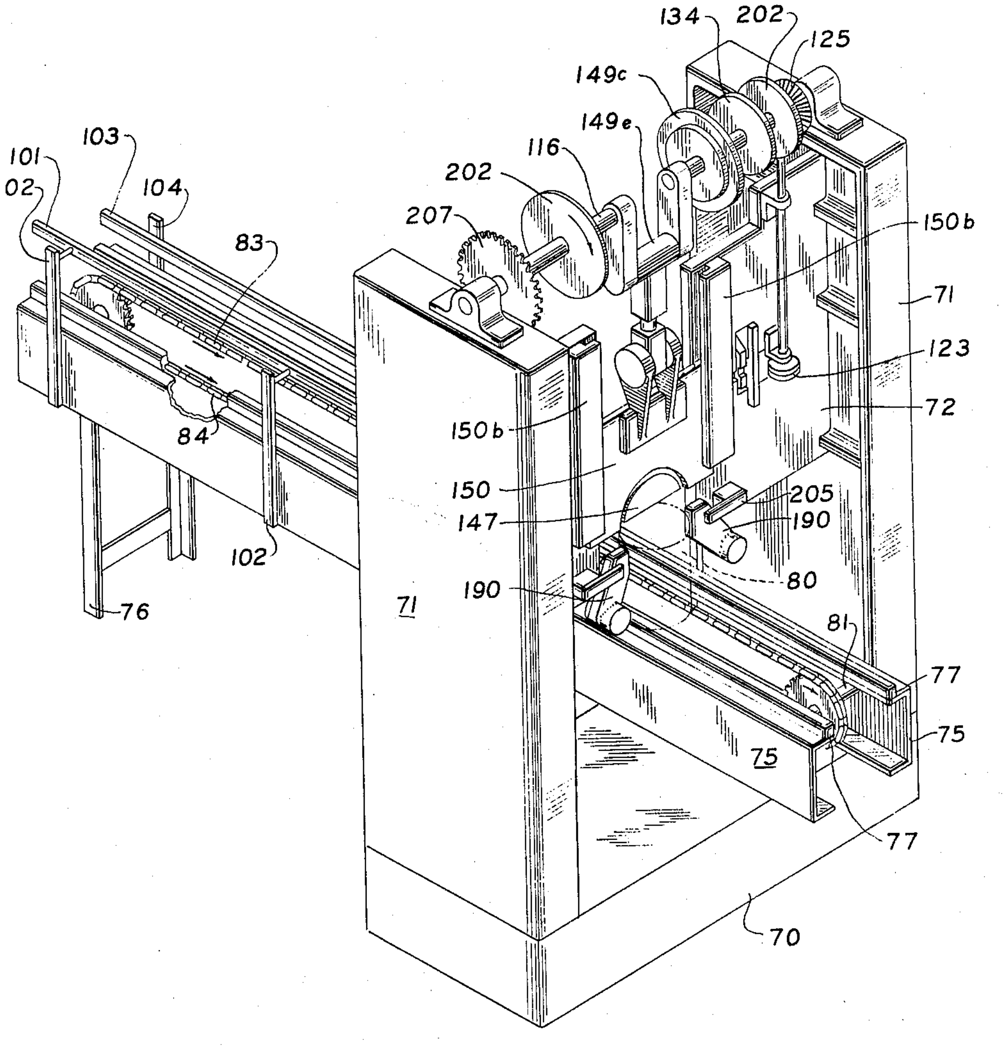
FIGURE 1 is a general simplified isometric view of the machine.

In one exemplified construction, the general arrangement of the major elements is shown in FIG. 1. The front end of the machine contains the bail forming and inserting apparatus and also acts as a support for the conveying system. Upon a base 70, rest two side frames 71. Joining the side frames 71 is a main plate 72. Conveyor side rails 75 are supported in the front by the main plate 72 and in the rear by a support frame 76. Upon the side rails 75 are guide rails 77 which restrain a one-gallon can 80 in its lateral movement.

Figure 2:
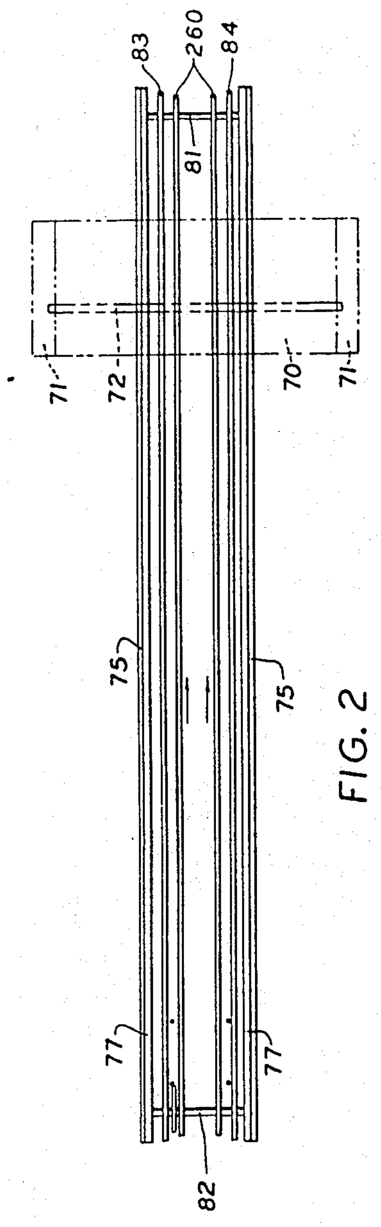
FIG. 2 is a somewhat diagrammatic fragmentary plan view showing the arrangement of major elements of the transporting and orienting means.
Figure 3:
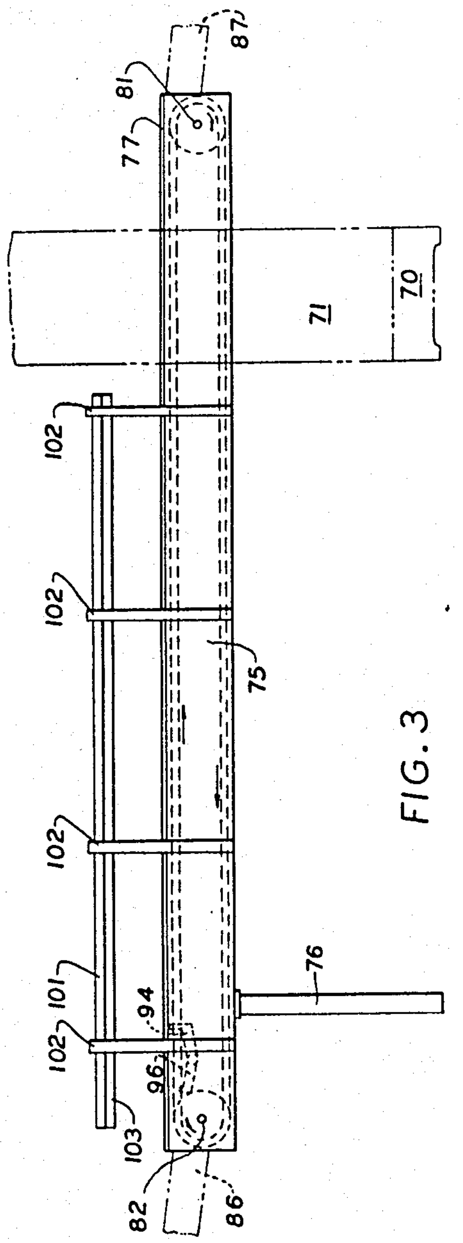
FIG. 3 is a somewhat diagrammataic fragmentary side view showing certain elements of the transporting and orienting means.

As shown in FIGS. 2 and 3, the side rails 75 support a front drive shaft 81 and a rear shaft 82. Between shafts 81 and 82 are a high speed carry chain 83 driven from the shaft 81, by mechanism hereinafter to be described, and slow speed carry chain 84 driven directly from the shaft 81. For example, the chain 83 may move at one hundred linear feet per minute and the chain 84 at fifty feet per minute. An incoming feeding system 86 and an outlet conveyor system 87 are indicated in phantom outline in FIG. 3. The incoming feeding system 86 may be a part of a continuous operation in which transfer stations and conveyors bring the cans 80 through various operations such as filling, capping, label-applying, and any other operations requiring completion before applying the bail to the can. The outlet conveyor system 87 may transport the bailed can 80 to each such subsequent operations as packing and shipping. The length, arrangement and operative speeds of systems 86 and 87 may, of course, be varied in accordance with individual requirements and conditions.

Figure 5:
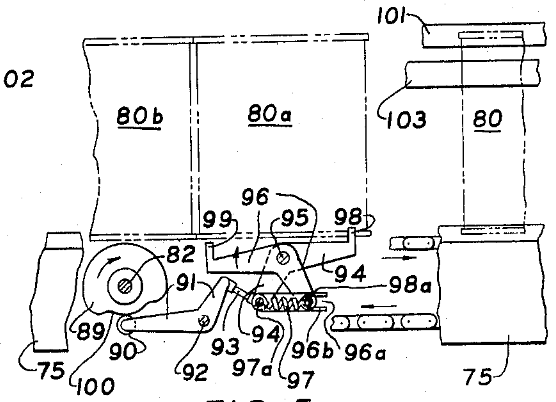
FIG. 5 is a fragmentary sectional view taken on the line 5—5 of FIG. 4.
Figures 4, 7:
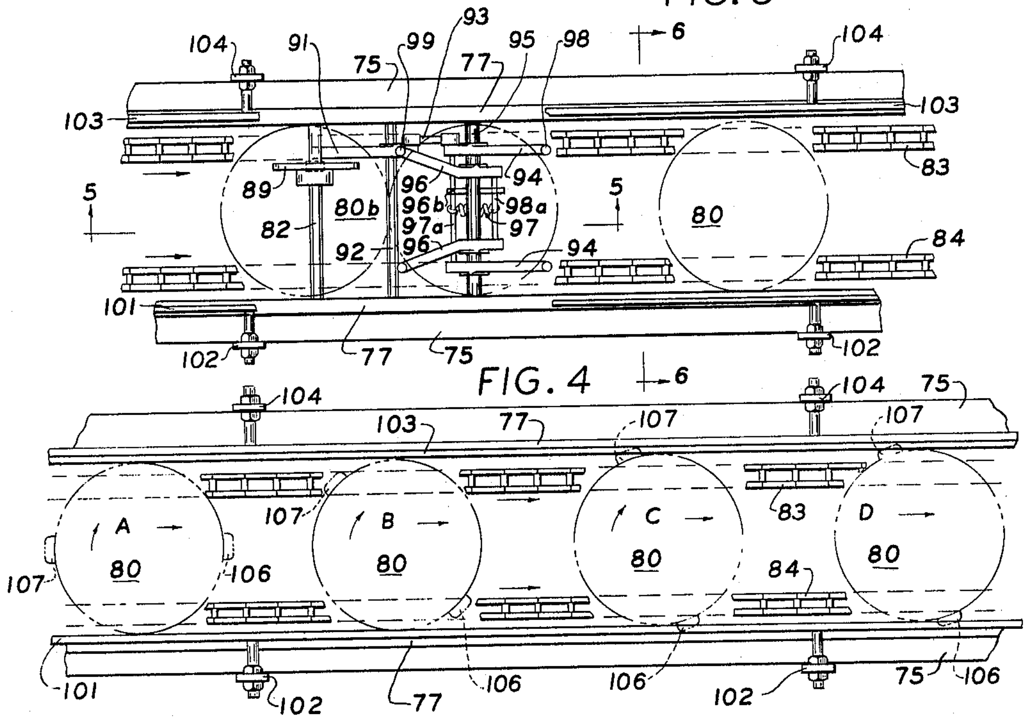
FIG. 4 is a fragmentary top view of the main conveyor showing the gate feeding mechanism.
FIG. 7 is a fragmentary top view of the transporting and orienting means illustrating the orienting of the cans.

In order that the flow of cans 80, as received from the incoming feeding system 86, be properly spaced on the conveyor system provided by the chains 83 and 84, a gate feeding mechanism is provided to regulate the release of cans 80 onto this conveyor system. This gate feeding mechanism operates in coordinated and direct relationship with the conveyor so that a steady, even flow of cans 80 is paced with the machine operation. As shown in FIGS. 4 and 5, the exemplified gate feeding mechanism utilizes the rear shaft 82 upon which a cam 89 is mounted. Activated by this cam 89 is rotatable cam follower 90 carried by an activating elbow arm 91 which is pivoted on a rod 92 mounted on the conveyor side rails 75. The arm 91 is connected by a link 93 to one of a pair of interconnected front stop arms 94 which are pivotally mounted on a shaft 95 attached to the conveyor side rails 75. To protect the can 80 from damage by the gate feeding mechanism it is found preferable to provide interconnected rear stop arms 96 also pivotally mounted on shaft 95, and normally retained against the end of a slot **96*a* in a plate 96*b* by a tension spring 97, but movable in a counter-clockwise direction (FIG. 5) to avoid jamming by a misformed or misplaced can. Interconnecting front stop arms is rod 97*a* upon which is mounted plate 96*b* and spring 97. In a like manner rear stop arms 96 are interconnected by a rod 98*a* which engages the slot 96*a* of plate 96*b* and also to which the spring 97 is attached. On the front stop arms 94 are integrally carried upstanding stop fingers 98. Likewise on the rear stop arms 96 are integrally carried upstanding fingers 99**.

In use, the gate feeding mechanism regulates the flow of can 80 in the following manner. Cam 89 in the position as shown in FIG. 5, with the cam follower 90 on the low part 100 of the cam 89, causes the front stop arms 94 to be in the up position. In this position the fingers 98 will be engaged by the lower rim of a can **80*a* thus impeding the flow on the conveyor of this can and any cans behind it. The carry chains 83 and 84 continue to move, and slide under can 80*a* until such time as the rise portion of the cam 89 engages cam follower 90. When this occurs the front stop arms 94 drop down and the fingers 98 disengage from the rim of the can 80*a*. Meanwhile rear stop arm 96 rises up and the fingers 99 impede the progress of a following can 80*b* by the engagement of fingers 99 with the rim of that can. When the rotation of the cam 89 again brings the low portion 100 in line with the cam follower 90, the rear stop arms 96 is lowered so that fingers 99 disengage the rim of can 80*b*, permitting that can to move forward on the carry chains 83 and 84 and then to engage the fingers 98 of the now raised front stop arms 94**.

Figure 6:
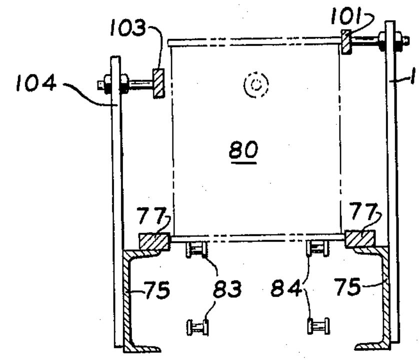
FIG. 6 is a fragmentary cross section of the conveyor taken on the line 6—6 of FIG. 4.

After the release of a can from fingers 98, the carry chains 83 and 84 and move the can forward. The means to orient a can 80 and prevent it from tipping is shown in FIG. 6 in which an upper side guide 101 is mounted so as to just contact the upper rim of a can 80. The upper side guide 101 is mounted on supports 102 attached to side rail 75. An ear guide bar 103 is located on the opposite side of the conveyor and is adjustably mounted to ear guide supports 104 which are attached to side rails 75.

FIG. 7 shows the action of the can 80 as it is moved forward on the conveyor system for the purpose of being oriented. A can 80 with two ears 106 and 107 may, when released by the fingers 98, have the ears in any position relative to the ear guide bar 103. The designation of the ears by two reference numerals is only for the purpose of clarity of description since both ears, as constructed, are intended to be identical and on diametrically opposite sides.

As released, a can 80 at position A may have ears 106 and 107 in a position away from the ear guide bar 103. When operating, the high speed carry chain 83 moves at a speed faster than that of slow speed carry chain 84. However, both carry chains 83 and 84 travel in the same direction as indicated by the arrows. The can 80 is retained in the desired position by guide rails 77 (see FIG. 6). The difference in speed of the carry chains 83 and 84 induces a rotating motion to the can 80. This rotation is illustrated by the difference of location of the ears 106 and 107 as the can 80 moves from position A to position B. As the can proceeds down the conveyor, the rotation continues until an ear, such as the one designated 107, contacts the ear guide bar 103 at position C. When the ear 107 makes contact with the ear guide bar 103 the rotation of the can 80 ceases, and the now-oriented can moves down the conveyor at a speed substantially that of the slower carry chain 84. The positions C and D are those of a can 80 after the orienting has been completed. It is of note that cans 80 with one or two ears missing are sometimes fed from the incoming feeding system 86 through the gate feeding mechanism and the conveyor system. When a can 80 with one ear missing is moved down the conveyor the can 80 will rotate until its remaining ear engages the ear guide bar 103. An earless can 80 will continue to rotate until passed through to the outlet conveyor system 87.

Figure 8:
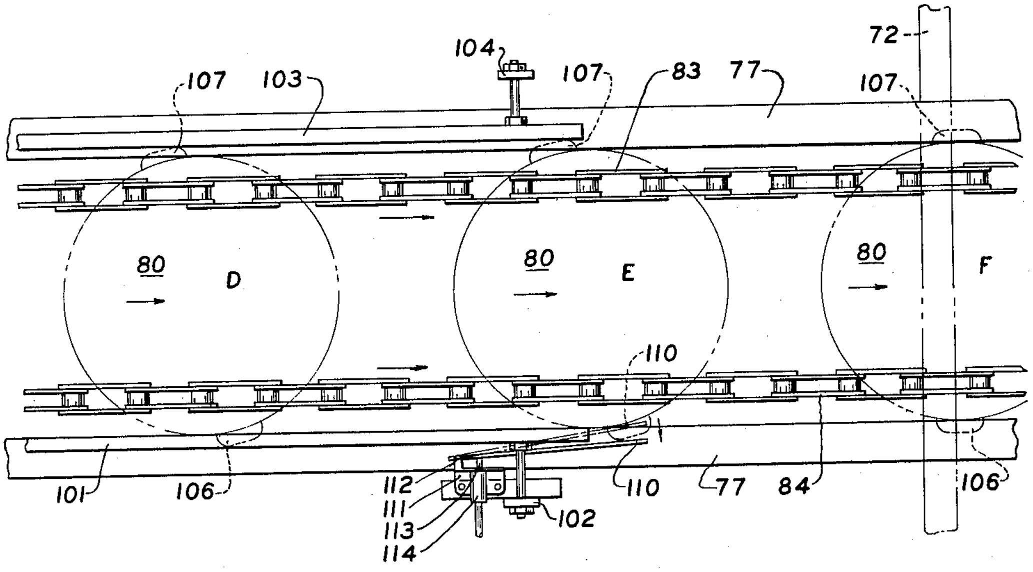
FIG. 8 is a fragmentary top view further along the conveyor showing the detection station.

In the present instance, the importance of the ear guide bar 103 and its relation to the contacting ear 107 is demonstrated in FIG. 8. At the position E on the conveyor the ear 107 is in contact with ear guide bar 103 while ear 106, spaced diametrically opposite is in position at a detection station to activate further operations.

In the exemplified apparatus, a trigger bar 110 is pivotally mounted on a support bracket 111 by a pin 112. The trigger bar 110 is arranged to move toward or away from can 80 in the plane of ear 106 by or against the pressure of the spring-urged limited-movement plunger 113 of a valve 114 mounted on bracket 111. As the can 80 moves on the conveyor from position D to position E, the ear 106 as it moves forward causes the trigger bar 110 to move outwardly from repose as shown in phantom outline to the activation position as shown. The movement of bar 110 outwardly also causes plunger 113 to move into the valve 114 to open the valve for later operations hereinafter to be described.

The arrangement shown in the present instance enables the detection of cans with two properly placed ears as contrasted with cans with only one ear or with no ears at all. Whereas a can with two properly placed ears will cause the trigger bar 110 to move outwardly, a can with only one ear will rotate until that ear contacts ear guide bar 103 whence it will proceed along the conveyor and as it passes the trigger bar 110 at position E there will be no ear to contact the trigger bar 110. Thus the valve 114 will not be activated. In a like manner, if a can has no ear, the can will travel and rotate on the conveyor but in passing the detection station no ear will be in position to engage the trigger bar 110.

The guide bar 103 and upper side guide 101 terminate just forward of the detection station at position E (FIG. 8). The can 80, still traveling on chains 83 and 84 and no longer having the restraining influence of ear guide bar 103, will once again start to rotate. By properly selecting the distance from position E to F, the distance being calculated from the speed of the conveyor and the differential in speed of chains 83 and 84, the can is caused to turn so that the ears at position F are in a generally right angled relationship to the conveyor, position F being the point where the bail insertion takes place.

In the present instance the conveying elements are so constructed and arranged as to eliminate contact with the sides of can 80. The gate feeding mechanism with fingers 98 and 99 as well as guide rails 77 engage only the bottom rim of the can 80. The upper side guide 101 contacts only the upper rim of can 80 while ear guide bar 103 is spaced so as to contact only ear 107 and trigger bar 110 is also spaced to contact only ear 106. Thus any can with a label normally applied to the side of the can is not likely to have the label contacted by any of the elements enumerated above.

The bail making and inserting station comprises many elements and motions. Many of these motions occur in sequences. To best illustrate and describe the many interdependent elements and motions, both general views and enlarged views are used in connection with the following portion of the disclosure dealing with this station, and, insofar as practical, each separate motion and action is illustrated and described.

Figure 9:
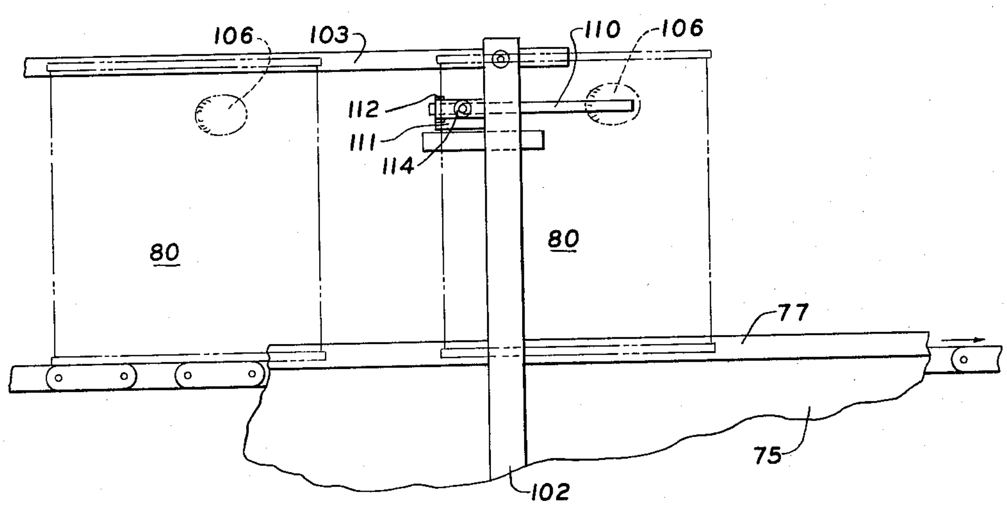
FIG. 9 is a framentary side view of the elements shown in FIG. 8.
Figure 10:
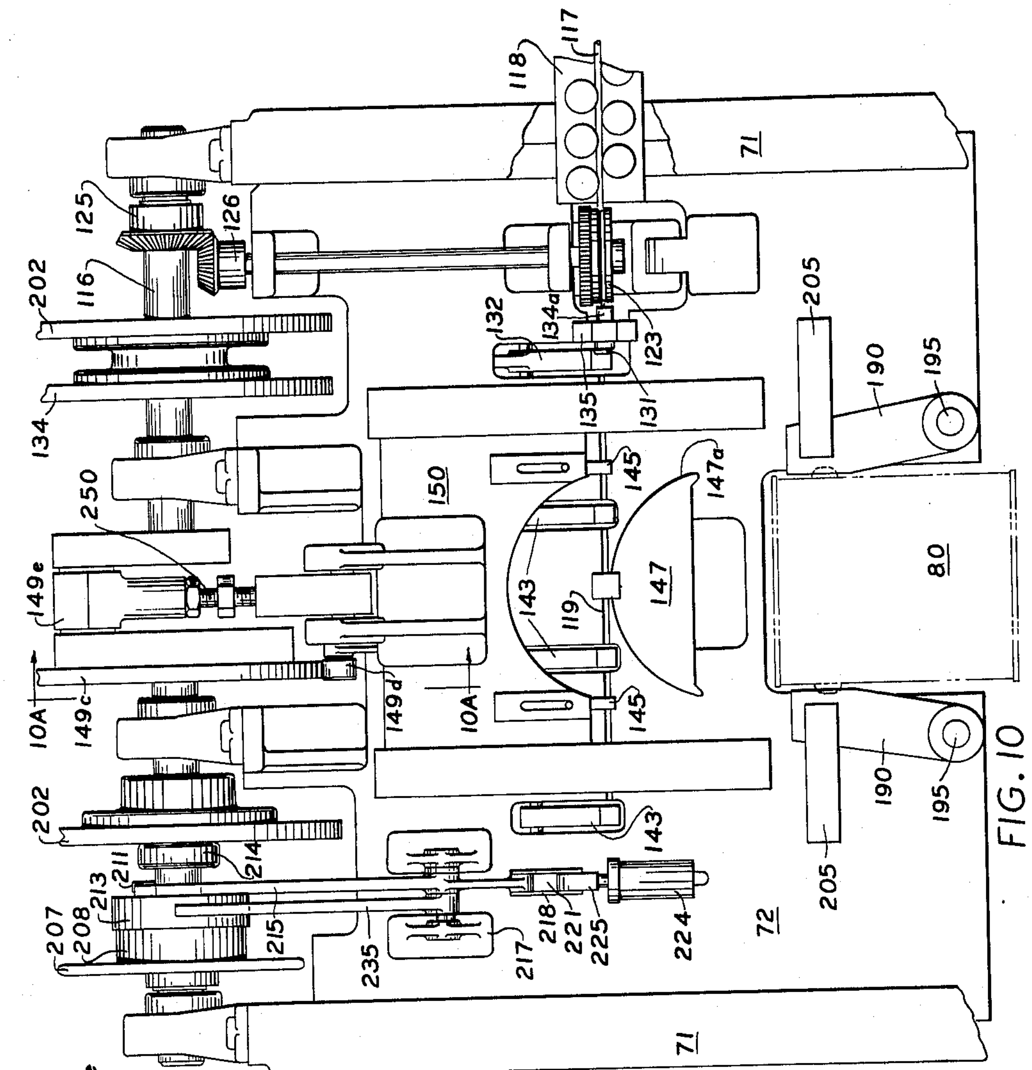
FIG. 10 is a front view of the elements in the bail making and inserting station.

The mechanism at this station, shown in FIG. 10, provides the following functions:

(A) It is actuated in response to the operation of the valve 114 shown in FIGS. 8 and 9, by means including a clutch mechanism which engages a crankshaft 116 and causes it to rotate.

(B) A wire feed unit, driven from the crank-shaft 116, draws wire 117 from a supply reel (not shown) through a wire straightener (conventional) 118 to the position shown in FIG. 10.

(C) At a predetermined point of rotation of the crankshaft 116, the wire 117 is cut to provide a short wire 119 which is transferred to bending dies, bent into a generally U shape, then becoming a bail wire 121, and moved to a point where the ends of the bail wire 121 may be formed into loops.

(D) While the bail wire 121 is being formed into a bail, the can 80 with ears 106 and 107 moves into the position shown at F in FIG. 8 under the bail forming apparatus, whereupon the ends of the bail wire 121 are formed into loops, and the loops as they are formed enter into the ears 106 and 107 of the can 80.

(E) The can 80 with the bail now attached is released from this station and proceeds to a disposition on the outlet conveying system 87.

Figures 11, 12:
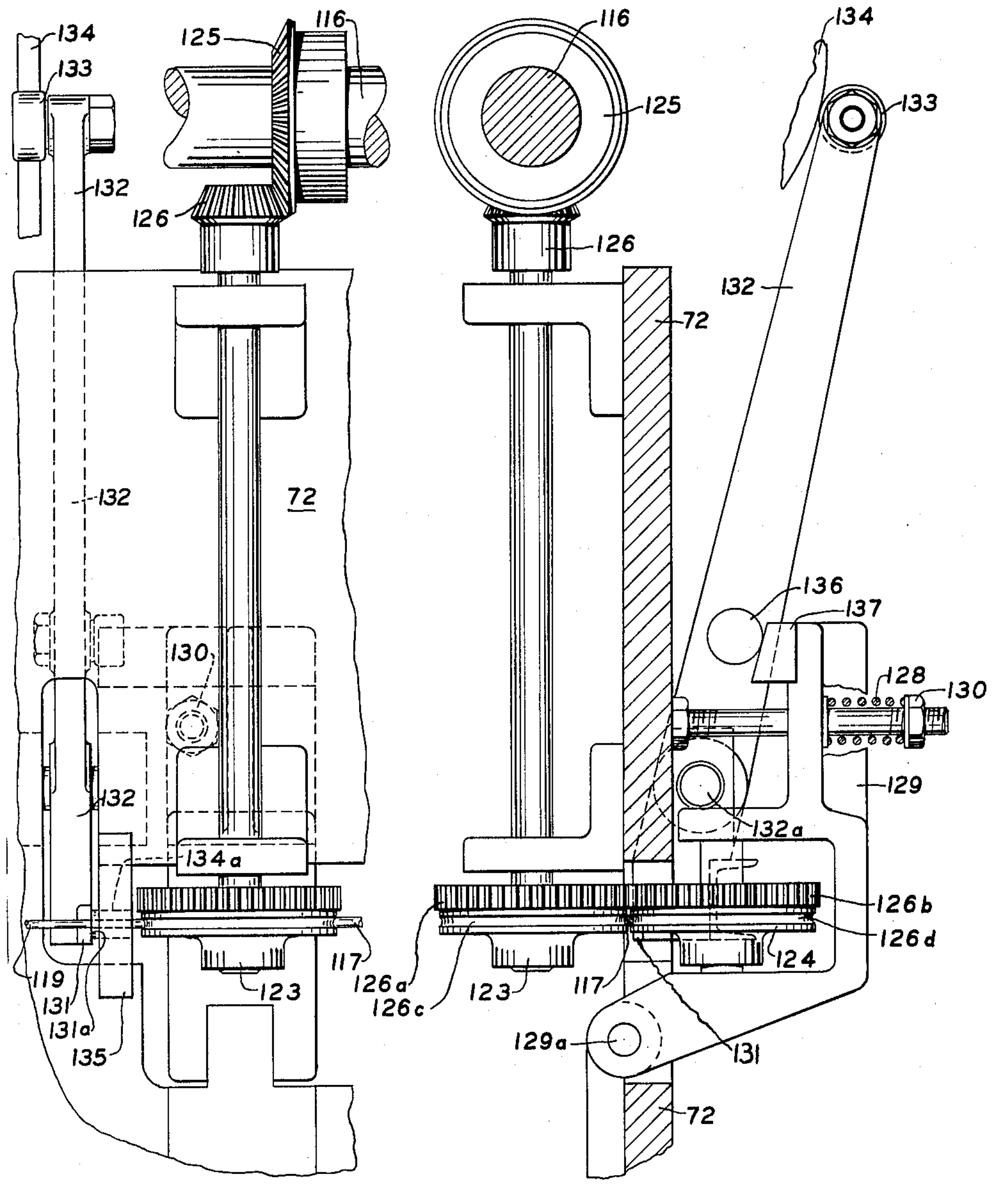
FIG. 11 is an enlarged front view of the elements of the wire feeding mechanism.
FIG. 12 is a partly sectional side view of the elements of the wire feeding mechanism shown in FIG. 11.

A preferred wire feed and cut off mechanism is illustrated in FIGS. 10, 11, and 12. Wire 117 after moving through wire straightener 118, enters a pair of feed rolls 123 and 124. The driven feed roll 123 receives its power from crankshaft 116 through bevel gear 125 to pinion 126. The feed rolls 123 and 124 have toothed portions **126*a* and 126*b* respectively, which mesh with each other, so that driven roll 123 drives rear roll 124. Being meshed, the rolls 123 and 124 turn toward each other and are so spaced that wire 117 is frictionally engaged in a pair of grooves 126*c* and 126*d* formed in the respective feed rolls 123 and 124. The rear roll 124 is spring biased toward the front roll 123 by a spring 128 which loads a feed roll bracket 129 pivotally attached at 129*a* on the main plate 72. The desired tension of the spring bias is secured by adjusting a nut 130**.

Figure 14:
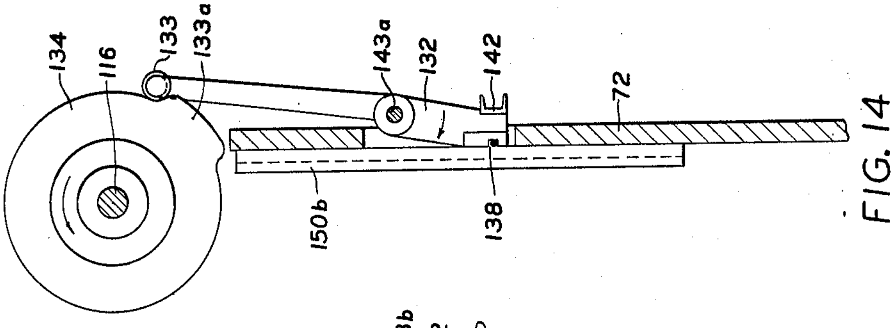
FIG. 14 is a fragmentary sectional view taken on the line 14—14 of FIG. 13 showing the cutting mechanism.

The wire cutting is performed by apparatus which includes an element 131 having a cutting edge **131*a* and mounted on a cutting arm 132 pivoted at 132*a* one end of which terminates with a cam follower 133, activated by a rise 133*a* (FIG. 14) on a cam 134 fixed to the crankshaft 116. Wire 117 is fed through bushing 134*a* in a die block 135 and the cutting edge 131*a* is adapted to cut the wire 117 at the point where it leaves the bushing 134*a*. As the wire 117 would still tend to move forward if driven by rolls 123 and 124, it is of benefit to the wire 117 and rolls 123 and 124 to relieve the spring bias on rear roll 124 at the time of cutting. Accordingly the rise 133*a* on the cam 134 causes the upper part of the arm 132 to move back, a roller pin 136** on arm 132 engages a contact block 137 attached to feed roll bracket 129. As feed roll bracket 129 is moved backward against spring 128, the rear feed roll 124 moves away from wire 117 removing the frictional drive force on wire 117.

Prior to cutting, the wire 117 will have moved into a measuring, cut-off, and transfer position. To this end, as exemplified in FIGS. 13 and 14 a groove 138 is provided in the main plate 72, the groove 138 terminating at a stop block 140. After moving through die block 135, wire 117 proceeds in groove 138 to stop block 140, where it is prevented from moving further forward. The spring biased feed roll 124, as explained above, is then activated so as to permit the rolls to slip on the wire 117, now stopped, until the wire is cut by cutting arm 132 as explained above. In the present instance it requires approximately fourteen inches of wire to make a bail, the cut wire being designated 119.

Figures 13, 15A:
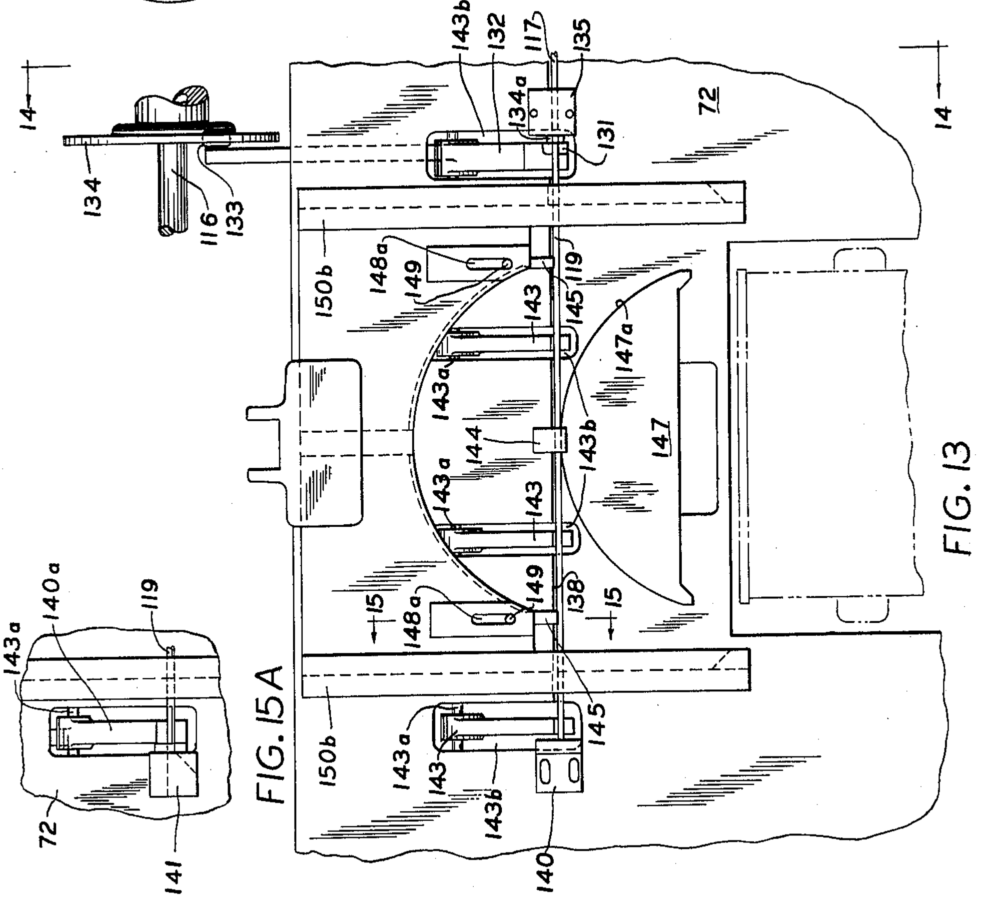
FIG. 13 is an enlarged front view, with the can holding means omitted, showing the wire cut off and transferring mechanism.
FIG. 15A is a fragmentary front view of an alternate form of construction involving the use of a supplemental wire cut-off element.

It is often desirable to make cut wire 119 even more precisely to an exact length. An alternate means and method of cutting wire 119 is shown in FIG. 15A wherein stop block 140 is removed. An additional cutting arm 140*a*, similar to the cutting arm 132 and similarly operated, is provided at this far end of the wire together with a die block 141 attached to main plate 72. By precisely positioning the two die blocks 135 and 141 and simultaneously cutting wire 119 at both ends, the length of the wire may be held to very close limits.

Figure 18:
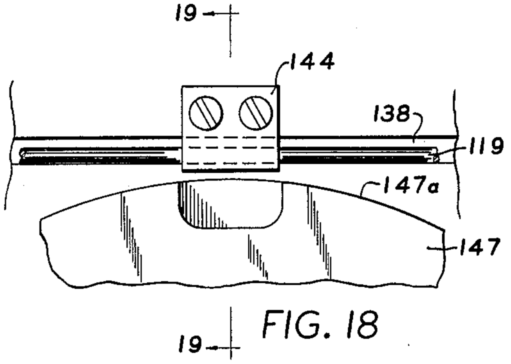
FIG. 18 is an enlarged detail front view of the wire clamp block and associated members.
Figure 19:
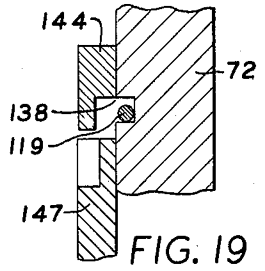
FIG. 19 is a section view taken on the line 19—19 of FIG. 18.
Figure 20:
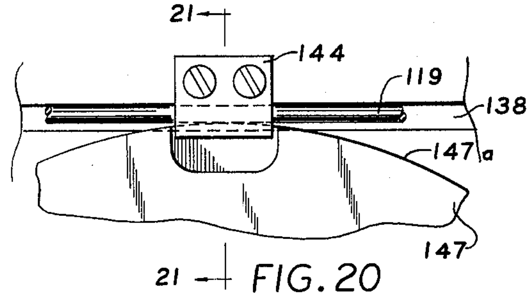
FIG. 20 is an enlarged front view of the wire clamp block with the lower die shoe engaging the wire.
Figure 21:
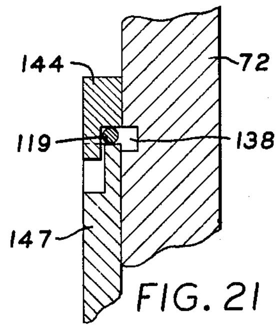
FIG. 21 is a sectional view taken on the line 21—21 of FIG. 20.
Figure 16:
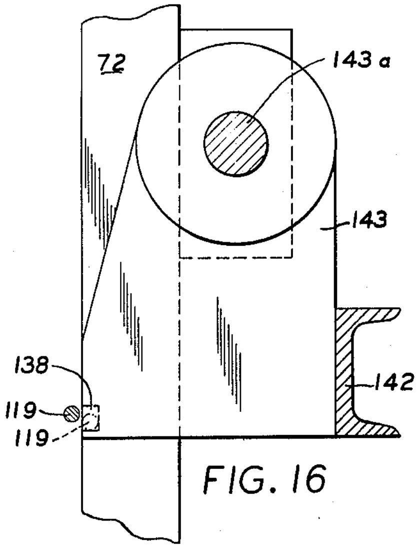
FIG. 16 is an enlarged partly sectional side view showing the transfer arm in detail.
Figure 17:
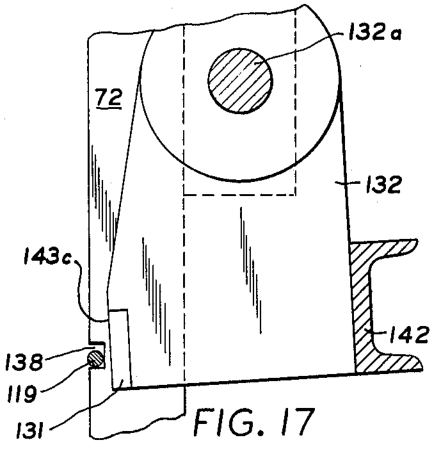
FIG. 17 is an enlarged partly sectional side view showing the cut-off knife in detail.

To move the cut wire 119 from groove 138 to a further operation, there is provided a transfer system comprising a connecting bar 142 attached to the cutting arm 132, the connecting bar 142 being further attached to transfer arms 143 each of which is pivotally mounted at 143*a* near its upper end to main plate 72 for movement in slots 143*b* in the main plate, and the arm 132 being also formed with a transfer face 143*c*. As the connecting bar 142 moves forward with the cutting arm 132 so also will the lower ends of the transfer arms 143 move forward in unison. This movement will shift the wire 119 from the groove 138 to a point just forward of main plate 72. This is best illustrated in FIGS. 16 and 17. The wire transfer is illustrated in the sequence of FIGS. 18, 19, and 20, where cut wire 119 is first in groove 138 in front plate 72, and then is transferred out of the groove 138 to the limit imposed by a central wire clamp block 144 attached to the front face of main plate 72.

Figure 15:
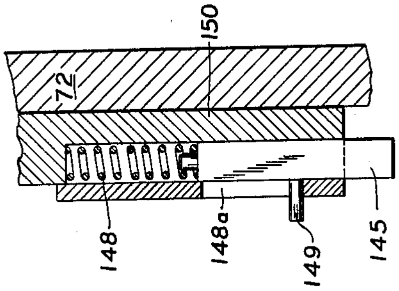
FIG. 15 is a sectional view of the spring loaded retractable finger on the line 15—15 of FIG. 13.

To assist in limiting the forward transfer movement of wire 119, spring loaded, retractable fingers 145 are used. (See FIGS. 13–15.) After the wire has moved to the wire clamp block 144, a lower die shoe 147 slidably mounted as hereinafter described, and having an upper surface 147*a* of inverted U shape, moves upward and grips wire 119 between the wire clamp block 144 and lower die shoe 147. The wire is grasped in a fixed position in that it is held on one side by the three transfer arms 143 and the face 143*c* of cutting arm 132, and held on the other side by wire clamp block 144 and the two retractable fingers 145. A compression spring 148 produces a downward load on each retractable finger 145 and the lower end of a slot 148*a* limiting the downward movement of a pin 149 on the finger 145. In a later sequence the finger 145 is moved upward to release the wire after it is formed into a bail 121 (see FIG. 36). The lower die shoe 147 is attached to a vertically slidable back plate 149*a*, which is normally urged upwardly by spring 149*b*, its upward movement being controlled and limited by a cam 149*c* and a cam follower 149*d* in a manner hereinafter to be described.

Immediately following the transfer of the wire 119, and actually as a smooth continuation of the same motions, the measured and cut wire 119 is bent into a U shape with the straight portions of the U being turned downward. FIGS. 22, 23, and 24 show the transition of cut wire 119 from straight to the bent U form 121.

The straight wire 119, in FIG. 22, is held as described above. At this point the lower die shoe 147 has approached the centrally located wire clamp block 144 and in so doing has gripped the wire 119 at this central point. The crank 149*e* of the crankshaft 116 carries an upper die shoe 150 having an under surface 150*a* of inverted U-shape. As the surface 150*a* approaches the wire 119, contact blocks 151 fastened to the upper die shoe 150 are nearly in contact with the wire 119. The sequence a little later is shown in FIG. 23. The lower lie shoe 147 is still in the position shown in FIG. 22. However, the upper die shoe 150 moving in guides 150*b* now has moved down so that the contact blocks 151 have engaged the cut wire 119 and are commencing to bend the wire into wire bail 121 to the lower die shoe 147. A fragmentary portion of one of a pair of curling dies 152 in its relative location is also shown in this view. In the next sequence, shown in FIG. 24, the lower die shoe 147 is still in the same position. However, the upper die shoe 150 has now moved down so that the wire 121 is fully formed insofar as the U-shape is concerned. Each end of the wire 121 is in a position just above one of the curling dies 152. The upper die shoe 150 is formed with a groove 152*a* to receive the member 144 as the die shoe descends.

In the present instance the contact blocks 151 are made of carbide or of hardened steel for maximum wear (see FIG. 25). The contact blocks 151 are made only sufficiently thick so as to act on the wire as it lies in a single plane against the main plate 72. The upper die shoe 150 maintains the wire in a single plane by means of a forming groove 153 formed in its surface 150*a* adjacent to the main plate 72. As the wire is in its final U-forming operation, the contact blocks 151 act as the outside formers to cause a portion of the wire to be bent straight in a downward manner. The arrangement of the contact blocks 151 and the former groove 153 is best shown in FIGS. 25 and 26.

Figure 27:
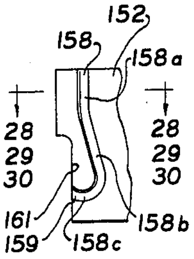
FIG. 27 is a partial front view of a curling die.

The end forming of the U-form wire 121 is by means of the curling dies 152. In addition to the preferred embodiment, variations embodying changes in the groove formation or arrangement may be made. The curling die 152 (FIG. 27) has a groove formed in the face of the die. This groove provides a channel for the ends of wire 121 to follow in order to form the wire into a bail. In order for the bail to release easily from the groove after the bail is fully formed and in place, it is necessary that the groove be made with relieved sides. The groove shown in FIG. 28 has an inner sloped wall 155, an outer sloped wall 156, and a back wall 157. This groove has the sides sloped and so spaced that the wire 121 will contact each side at such a depth that the outer edge of the wire 121 will be on a line with the front face of the curling die 152. As a practical matter it has been found that the slope of the sides is very effective if the included angle is approximately 35 degrees. This is based on using a No. 12 soft steel galvanized wire with a tensile strength of 75,000 to 90,000 p.s.i. To insure that wire-size variations do not cause the wire 121 to sink too deep into the groove the back wall 157 is located so that the wire in theory has a three point contact with walls 155, 156, and 157 as well as contact with a cover stop arm which will be described later.

The groove in each die 152 has an upper or inlet portion 158 which is virtually straight and vertical in extent. At a short distance from the upper edge of the die 152 the groove is curved at 158*a* toward the outside, and for ease of manufacture extends straight diagonally outwardly at 158*b*. The groove is then curved inward at 158*c* for the loop forming section, the curve ending in an upwardly-curved portion 159.

Figure 35:
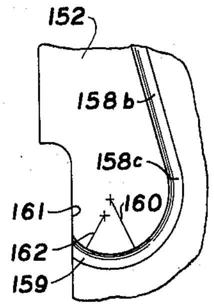
FIG. 35 is a partial view showing an enlarged view of the loop-forming section of the groove.
Figure 36:
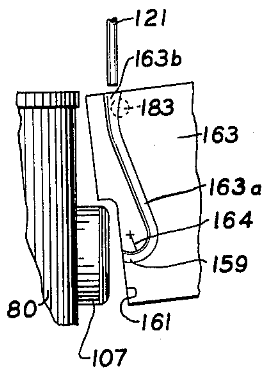
FIG. 36 is a view of a swivel die in open position to an ear of a can.
Figure 37:
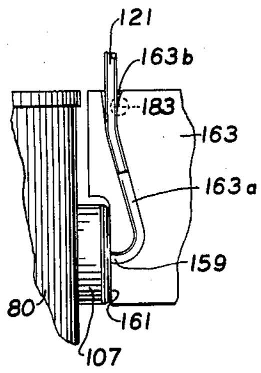
FIG. 37 is a view of a swivel die closed to the ear of a can with the loop formed and inserted.
Figure 38:
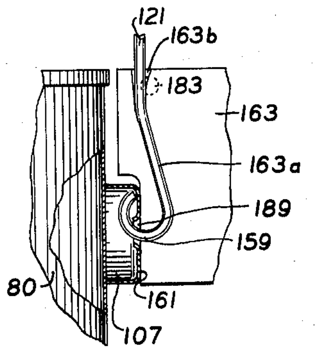
FIG. 38 is a view of a swivel die closed to the ear of of a can.

For the effective formation of the desired end loops in wire 121 the preferred embodiment of the groove is in the form of a slightly tightened spiral as shown in FIG. 35. The portion 158*c* is first curved on a 0.190 inch radius 160 the center of which is located a distance in from outlet edge 161 of die 152. At a lower point and nearer to the edge 161 is a portion curved on a 0.170 inch radius 162 to the edge 161 of the die. It is also possible to form the loops by having the curve formed of a single radius, the center being located approximately midway of the two centers shown in FIG. 35. The single radius die 163 is shown in FIGS. 36, 37, 38 in which the radius 164 of the groove 163*a* is 0.180 of an inch as shown in FIG. 36. The groove 163*a* has a widened entrance portion 163*b*. Of special note and significance is the continuing of the curve past the center line of the radius so that the final portion of the groove slopes upward at 159 thus counteracting the natural spring back of the wire 121 as it is being formed and also to insure that end of the wire as it enters the ear 107 will be in an upward direction. In the placing of the groove in the curling die 152 it has been found important to have the groove so formed as to have the center line of the spiral or other curve a little distance in from the outlet edge 161. As shown, such a groove design enables the ends of wire 121 to be formed into a tight loop without undue and unwanted deformation of the wire cross-section.

Figure 28:
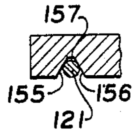
FIG. 28 is a cross section of the die taken on the line 28—28 of FIG. 27.
Figure 29:
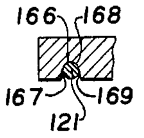
FIG. 29 is a cross section of the die taken on the line 29—29 of FIG. 27.
Figure 30:
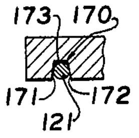
FIG. 30 is a cross section of the die taken on the line 30—30 of FIG. 27.

In certain instances the cross section of the groove may be varied from that shown in FIG. 28, and described above. A round-bottomed groove 166 is shown in FIG. 29 in which inner sloped wall 167 merges into a curved rear wall 168 which joins an outer sloped wall 169. This groove configuration causes more of a drag on the wire hence is less desirable in most applications. A further alternate form of groove is shown at 170 in FIG. 30. This conformation has both an inner sloped wall 171 and an outer sloped wall 172 at approximately the minimum angle affording a release to the wire 121. This angle is usually at about fourteen to sixteen degrees included. A straight back wall 173 of the groove prevents wire 121 from going too deep into the groove. The temper or softness of the wire 121 determines the minimum angle that can be formed in the groove before the wire will tend to wedge in the groove. The groove 170 offers nearly the same operating advantages as groove 158 but the more acute angle diminishes the permissible variation in the wire 121 diameter.

Figure 31:
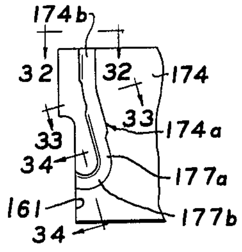
FIG. 31 is a partial front view of an alternate groove configuration of curling die.
Figure 32:
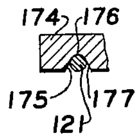
FIG. 32 is a cross section of the die taken on the line 32—32 of FIG. 31.
Figure 33:
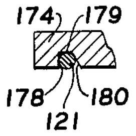
FIG. 33 is a cross section of the die taken on the line 33—33 of FIG. 31.
Figure 34:
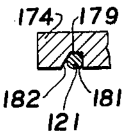
FIG. 34 is a cross section of the die taken on the line 34—34 of FIG. 31.

A further embodiment of a groove configuration is shown in die 174 in FIG. 31. The groove 174*a* has its initial vertical extent 174*b* formed as shown in FIG. 32 wherein an inner sloped wall 175 merges into a curved back wall 176 thence to an outer sloped wall 177. As the groove curves outward toward and into the following straight diagonal extent 177*a*, the groove has an extent such as shown in FIG. 33 wherein a perpendicular wall 178 is now the inside wall. A back wall 179 parallel with the face of the die 174 meets an outward sloped wall 180. As the wire 121 proceeds along the groove at this curved extent the force developed in turning the wire from the vertical extent 174*b* to the diagonal extent 177*a* is exerted against the perpendicular side 178. At a point not later than the point where the groove curves inwardly the groove is once more altered so that the wire 121 again exerts its pressure against a straight wall. The configuration spiral part 177*b* of the groove (and, in the present instance, of the later portion of the extent 177*a*) is shown in FIG. 34 wherein a perpendicular wall 181 is the outside wall and the flat back wall 179 meets with an inner outwardly sloped wall 182. The groove as formed in this die 174 offers an arrangement wherein the wearing of the groove in the die 174 is as minimal as possible since the pressure of bending the wire 121 is always primarily against a perpendicular surface, but where there is always a sloped surface present to reduce binding.

To accommodate the variations experienced in the manufacture and handling of cans and the ears attached thereto it is preferred to have the die 152 (and other dies described above) pivoted so as to adjust to the eared cans. Accordingly, as shown in connecton with the die 163 in FIGS. 36–38, the die is pivoted at a point thereon near the entry end of the groove, on a pin 183 inserted in main plate 72. The die is normally held in the retracted position by a light spring means (not shown). As the wire 121 enters the die 163, it causes the die to move inwardly until the edge 161 contacts an ear 107 (FIG. 37). The die remains in this position while the rest of the loop is formed and moved into the ear 107 as shown in FIG. 38.

The completion of the bail forming in relationship to the movement of the upper and lower die shoes is best shown in FIGS. 39 and 40. In FIG. 39 the upper die shoe 150 and lower die shoe 147 have grasped the wire 121 between them, the upper die shoe has moved the lower die shoe downwardly before it, and the ends of the wire have entered the curling dies 152. The can 80 is in its bail-receiving location where the outlets of the grooves of dies 152 are adjacent to the hole in the ears of the can. At this phase of the operation the spring loaded retractable finger 145 is still in the down position. The final end forming of bail 121 is shown in FIG. 40 in which the upper die shoe 150 has moved down, and carried the lower shoe 147 before it, the amount necessary to push the ends of the wire 121 through curling dies 152 and into the ears of the can. As will be seen from the drawings, all parts of the bail lie in a single (vertical) plane at this stage and at all stages during its formation. At this phase the spring loaded retractable fingers 145 have contacted the dies 152 and the shoe 150 has moved up so as to free the wire bail 121 from engagement with the fingers 145.

Figures 41, 42, 43, 44:
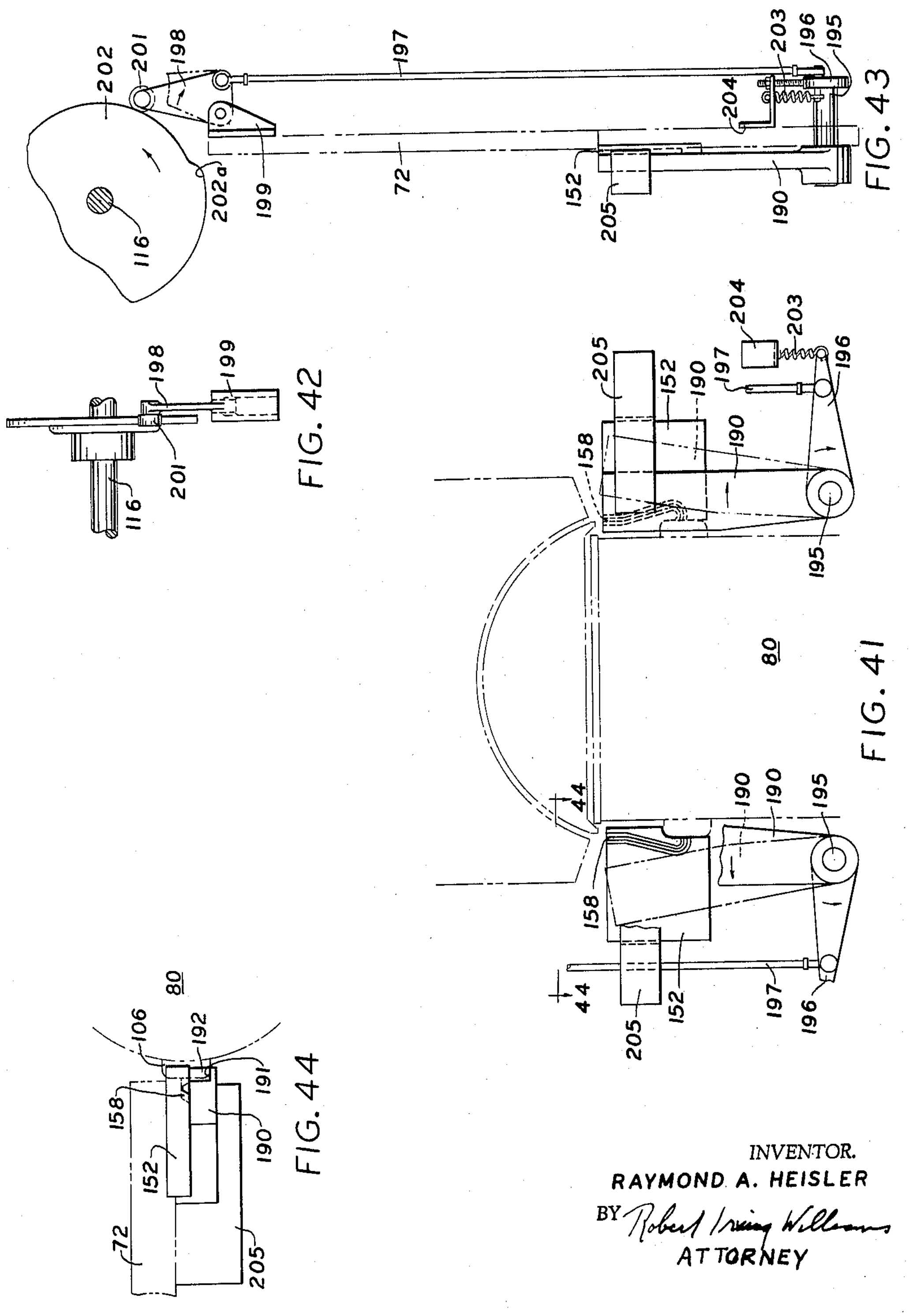
FIG. 41 is a front view showing cover stop arm mechanism.
FIG. 42 is a partial front view showing cam elements used in cover stop arm mechanism.
FIG. 43 is a side view of FIGS. 41 and 42.
FIG. 44 is a top view taken on the line 44—44 of FIG. 41.

Concurrently with the bending of the wire 121, as described above, other operations are being performed attendant to the proper location of the can 80 and the ears 106 and 107 in respect to the curling dies 152. As previously described, the can 80 causes an activation of the detection station by means of an ear 107 on an oriented can. The can then continues on the conveyor from position E to position F (FIG. 8) at which point the can 80 is held from further forward movement by engaging means which hold ears 106 and 107 in the desired position while the ends of wire 121 are curled and inserted into the wire-end receiving openings 189 (FIG. 38) in the ears 106 and 107. To accomplish this holding of a can, a gate control mechanism is used. The preferred embodiment is shown in FIGS. 41, 42, 43, and 44 wherein a pair of cover stop arms 190, having flat rearward faces which engage the front surfaces of the dies 152, having formed thereon abutting surfaces 191 adapted to engage the front edges of ears 106 and 107. Each abutting surface 191 is so constructed that it forms the lower side of a pocket 192 in the cover stop arm 190. The depth of the pocket 192 is determined by the distance from the outside of an ear to the near edge of the opening 189 in said ear. In use it is found that gallon cans currently have ears approximately eight-tenths of an inch wide. The cover stop arms 190 are so arranged as to slide on front faces of the curling dies 152. When the cover stop arms 190 are in the inward position as shown in FIGS. 41 and 44, not only are the abutting surfaces 191 in position to contact the ears 106 and 107, but the stop arms 190 also cover the grooves in curling dies 152 thus forming the front face for the wire forming grooves in curling dies 152.

To activate the cover stop arms 190 the preferred means are also shown in the FIGS. 41, 42, and 43. Each cover stop arm 190 is mounted on a pivot pin 195 which extends through the main plate 72 (shown in phantom outline in FIG. 43). A rear link arm 196 is mounted on each pivot pin 195, and in the present instance at approximately right angles to the cover stop arm.

Motion is imparted to each rear link arm 196 by a rod 197 which is pivotally attached to the rear link arm 196. The upper end of the rod 197 is pivotally attached to a cam follower arm 198 pivotally mounted on bracket 199. A roller cam follower 201 is mounted on the cam follower arm 198, and engages a cam 202 fixed to the crankshaft 116. The lobe 202*a* on the cam 202 as it revolves causes an outward movement of cam follower 201 which in turn imparts a movement to rod 196 and to cover stop arm 190 from the full-line position to the phantom-line position of FIG. 41. The cover stop arms 190 are maintained in a normally closed position (as shown in solid outline) by means of springs 203 extending from brackets 204, to rear link arms 196, the opening movement being by action of the lobes 202*a* of cams 202 as it overcomes the spring bias tending to keep the cover stop arms 190 in a closed position. To prevent forward movement of each stop arm 190, an assist block 205 helps arm 190 to retain its relative position to the face of the curling die as the end of the wire 121 is pushed through.

The movements of the wire and the various elements used in the forming and inserting of the bail into the ears of a can derive their motion from the rotation of crankshaft 116. The preferred embodiment of the clutch mechanism used to regulate and drive the crankshaft 116 is shown in FIGS. 45, 46, 46A, 47, and 48. A conventional pawl-type single revolution clutch as is often used on punch presses and the like has been modified to incorporate a hold system to accommodate the necessary time for a can 80 to travel from position E, where a signal is caused to be actuated by ear 107, to position F where the bail is inserted.

A power source imparts a constant rotation to sprocket 207. The hub 208 of the sprocket 207 is provided with engaging grooves 208*a* having abutting surfaces 209. In the present instance hardened inserts 210 are inserted and ground flush with the surface 209, the inserts 210 providing wear surfaces easily replaced. Sprocket 207 and its hub 208 are mounted on the shaft 116 for free rotation thereon.

A pawl 211 slides in a keyway 212 in shaft 116 and in a keyway 212*a* in a trip cam 213. A spring 213*a* (FIG. 46A) engages the rear of the pawl and is restrained by spring retaining collar 214, the spring urging the pawl 211 to the left (FIG. 45) so that, when the pawl is free to move, it will press against the right hand (FIG. 45) surface of hub 208 and/or will move into whichever groove 208*a* is first alined with it, so as to drivingly connect the shaft 116 with sprocket 207. The pawl and complementing components above are conventional both in design and use.

Figures 45, 46, 46A, 47, 48:
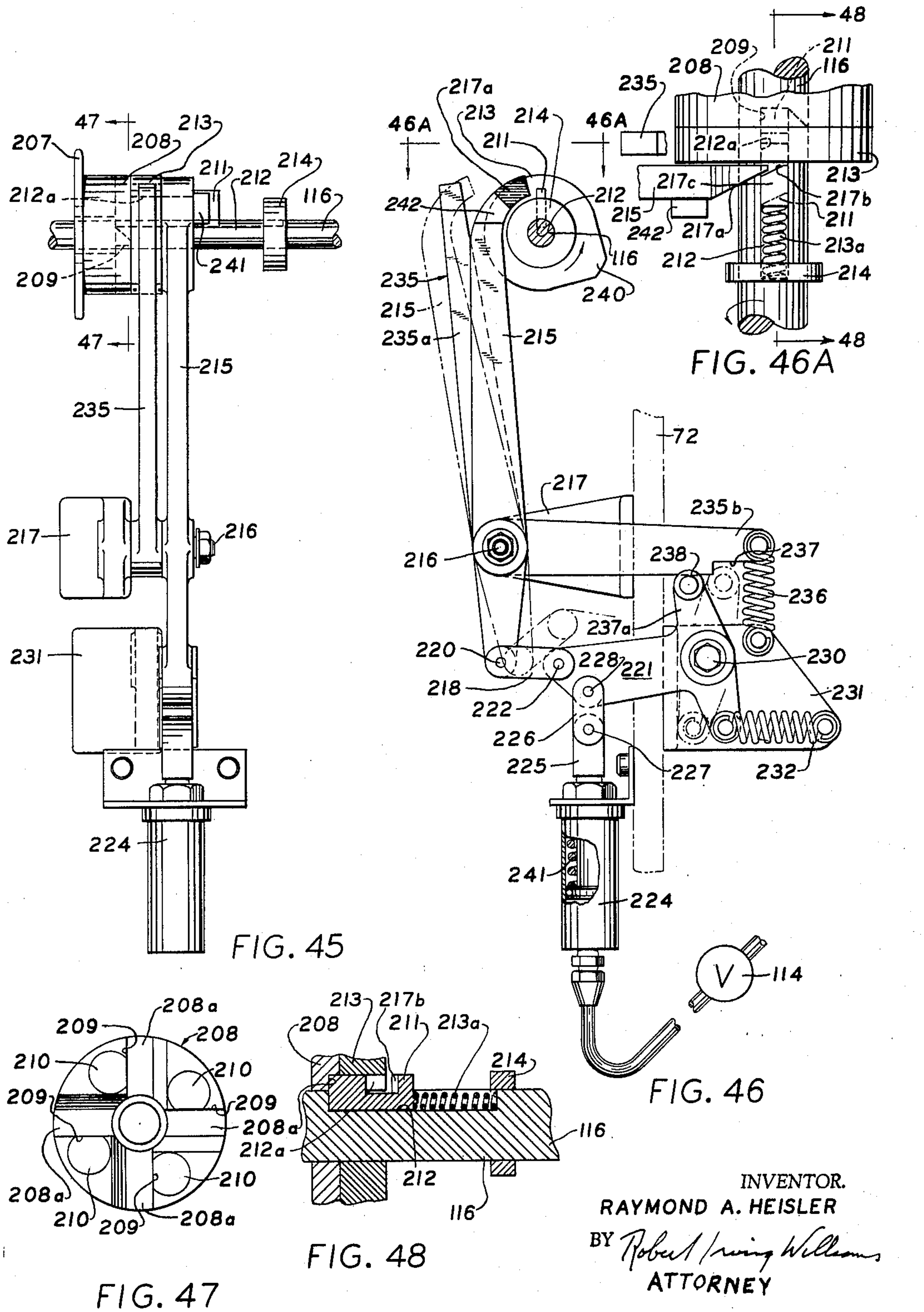
FIG. 45 is a front view of the clutch and trip mechanism.
FIG. 46 is a side view of the clutch and trip mechanism.
FIG. 46A is a fragmentary top view of the mechanism shown in FIG. 46 in a slightly more advanced position.
FIG. 47 is a sectional view taken on the line 47—47 of FIG. 45.
FIG. 48 is a sectional view taken on the line 48—48 of FIG. 46A.

A pawl arm 215 is pivotally mounted, intermediate its ends, on a stud 216 attached to a bracket 217. The upper end of the arm 215 is beveled at 217*a* so as to engage the beveled front end 217*b* of a lug 217*c* on the pawl 211, and to push the pawl to the right (FIG. 45). The lower end of the arm 215 is pivotally connected to one end of a connecting link 218 by means of a pin 220. The other end of the connecting link 218 is pivotally connected to a rocker arm 221 by means of a pin 222.

To activate the pawl arm 215, an air cylinder 224, receiving a supply of air released by valve 114 as a result of the actuation of the cam 80 passing the detection station, expands upward. To the piston rod 225 of the air cylinder 224 is mounted a connecting link 226, pivotally attached by a pin 227. The other end of link 226 is pivotally attached to rocker arm 221 by a pin 228. The rocker arm 221 is pivotally mounted on a pivot stud 230 mounted on a bracket 231. A spring 232 urges the rocker arm 221 to hold the position shown in solid outline in FIG. 46. As the piston rod 225 moves upwards, it in turn moves the connected end of connecting link 218 upward and toward the main plate 72. When the piston rod reaches the up or expanded position the link 218 and arm 221 will take the position shown in phantom outline, and the upper end of pawl arm 215 will move outward to the position shown in phantom outline in FIG. 46. This outward movement releases pawl 211 to engage under the pressure of spring 213*a*, whichever one of the abutting surfaces 209 is next alined with it during the rotation of the hub 208.

Since the valve 114 activates only briefly, in turn causing the rod of cylinder 225 to go up and return to the shown position, a hold mechanism is incorporated in the present instance. This hold causes pawl 211 to remain engaged for a desired period, and includes a trip arm 235 which is pivotally mounted on stud 216 and comprises one element 235*a* and a second element 235*b* which is a little more than ninety degrees from the first element. The second element is spring biased by a spring 236 attached to bracket 231. A detent 237 is formed in the end of the second element. When the piston moves rocker arm 221 upward, an offset 237*a* of the arm 221 with a roller pin 238 attached thereto moves upward and outward. The roller pin 238 moves into the detent 237 causing pawl arm 215 to be held in the out position by the arm 221. To release the hold, the lobe 240 on trip-cam 213 is so arranged in relation to the rotation of the crankshaft 116 that at a predetermined moment the lobe 240 will engage and push trip arm 235 counter-clockwise (FIG. 46). When the trip arm 235 is moved back by the lobe 240, the second element 235*b* of the trip arm 235 is raised, thus causing detent 237 to move upward releasing roller pin 238. Upon release, a spring 232 together with a return spring 241 in the cylinder 224, urges rocker arm 221 into the down position whereupon the pawl arm 215 moves forward, the beveled tip 217*a* of arm 215 engaging pawl end 217*b* and moving the pawl back, pulling it out of groove 208*a* to disengage it from hub 208. In operation, if there is a sufficient supply of cans 80 to utilize all the cycles of the feeding station, and all the cans have properly oriented ears, the cans 80 will activate the trigger bar 110 which will activate valve 114 which in turn will activate air cylinder 224. By selecting a speed for the crankshaft 116 just slightly faster than the cans are presented to the bail-inserting station, the pawl arm 215 can be held in the open position for a large portion of the time. The cylinder 224 causes roller pin 238 to drop into the detent 237 just as the lobe 240 of trip cam 213 releases the second element 235*b* of trip arm 235 to return to the down position. This permits the forming operation to become continuous when the cans 80 are fed in a continuous manner. Upon those occasions when the feeding of cans are sporadic or when there is a bailing operation to be performed on only a single can, mechanism is required to move thru only one revolution of crankshaft 116. It is essential that the apparatus be always in a given position at the start of forming a bail. Therefore the apparatus must stop at a certain position. In the present instance the pushing of pawl 211 out of engagement with hub 208 removes the driving force on shaft 116, and, because of the friction created by the movement of the various components, the crankshaft 116 stops almost immediately. The bevel tip 217*a* in the present instance starts to engage pawl 211 on pawl end 217*b* at a point about two hundred twenty degrees past top center and fully engages pawl end 217*b* at two hundred forty degrees or about one third revolution before the crank is again at the top location. To insure that the crank does not over-travel because of wear of the various components or other factors causing looseness, a stop block 242 is attached to arm 215 at a position just back of beveled tip 217*a*. If an over-travel is about to occur, surface 217*b* of the pawl end will slide on bevel tip 217*a* until pawl 211 engages the stop block 242 whence the free over-travel will cease. When arm 215 is moved to the position shown in phantom outline (FIG. 46) the stop block 242 will have moved to a position out of the path of rotary movement of pawl 211.

Figure 49:
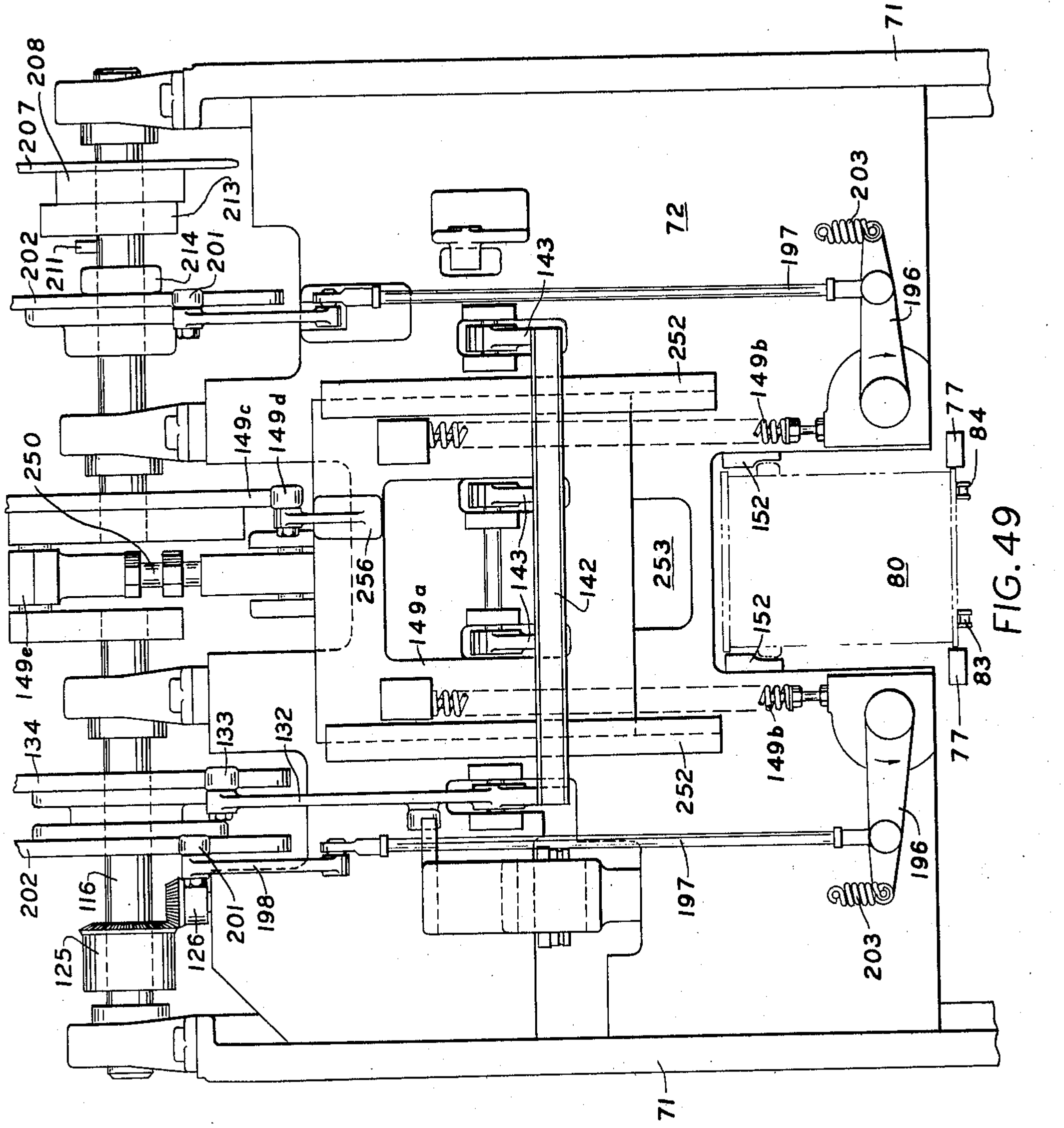
FIG. 49 is a rear view of the main plate assembly.
Figure 50:
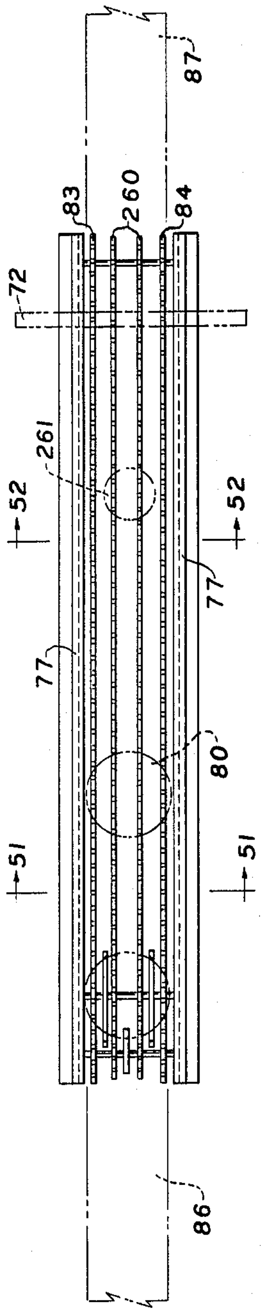
FIG. 50 is a top view of conveyor with intermediate chains.

Referring once more to FIG. 10 it is to be noted in the present instance it is deemed preferable to place many of the essential elements behind the main plate 72. Accordingly the other essential elements behind the main plate 72 are shown in FIG. 49.

Crankshaft 116 has the crank portion 149*e* carrying and driving the upper die shoe 150 as described above. A connecting rod 250 has provision to adjust and lock the upper die shoe so as to enable the downward travel of the upper die shoe 150 to be precisely set. The lower die shoe 147 is mounted on back plate 149a which is slideable up and down between guide rails 252. The lower die shoe 147 extends thru a cut out 253 in main plate 72. As above, the lower die shoe 147 is spring biased upward by springs 149b which maintain the pressure of the lower die shoe 147 against the wire 121.

Figure 10A:
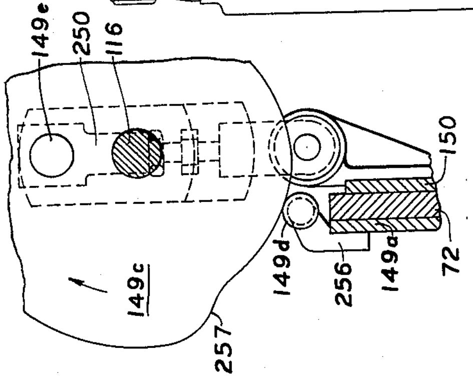
FIG. 10A is a fragmentary sectional view on the line 10A—10A of FIG. 10.

After the completion of the forming and inserting of the bail 121 into the ears 106 and 107 the release of the bail 121 and the can 80 is necessary so that the bailed can is able to move out of the machine. The cam follower 149d is carried on a cam driven arm 256 attached to the back plate 149a to which the lower die shoe 147 is attached. A lobe 257 on cam 149c (FIG. 10A) pushes cam arm 256 a short distance carrying the lower die shoe 147 further down to the position shown in the phantom line of FIG. 40, and further than carried by the upper die shoe 150. Meanwhile, the upper die shoe 150 has reached its lowest movement and has begun to move upwards. This separation of the die shoes releases the bail. Simultaneously the cover stop arms 190 move back from ears 106 and 107. The bailed can 80 now is able to once more move on conveyor chains 83 and 84 toward outlet conveyor system 87.

Figure 52:
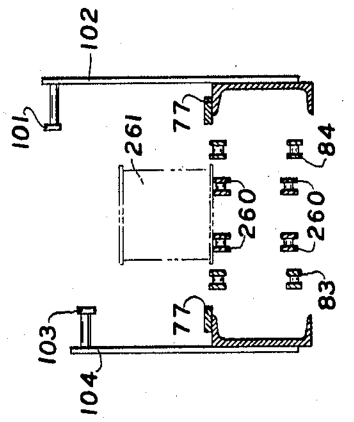
FIG. 52 is a sectional view on the line 52—52 of FIG. 50.
Figure 51:
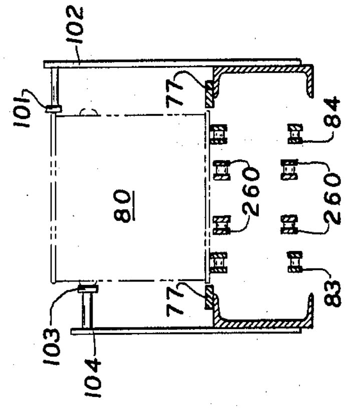
FIG. 51 is a sectional view on the line 51—51 of FIG. 50.

Modern equipment in many instances are only units in a production line and if such a system has a conveyor as a material transfer, the conveyor necessarily must be adapted to move the various items being processed. The processing of cans or containers of one, two, three, and five gallon size (which normally have the same diameter) requires only a conveyor such as is shown in FIGS. 2, 4, 5, 6, and 7. For the processing of (normally earless) cans of smaller diameter such as half-gallons, quarts and pints, intermediate chains may be spaced in relationship to chains 83 and 84. This intermediate system is shown in FIGS. 2, 50, 51, and 52. In FIG. 51, a one gallon can 80 is shown being transported on high speed chain 83 and slow speed carry chain 84. Between these chains and slightly below are intermediate carry chains 260 arranged to carry a one-quart can 261. Each chain 260 moves at the same speed as the other chain 260, and usually at a slightly faster speed than the incoming feeding system 86. As shown in FIG. 52, the lateral control of the smaller size of can 261 requires side guide means other than the guide rails 77. This lateral control is provided by the chains 83 and 84 which are arranged slightly above intermediate chains 260, the height being just sufficient for the bottom rim of small can 261 to contact the side of chains 83 and 84. In the present instance it has been found satisfactory for the chains 83 and 84 to be approximately one-quarter of an inch above chains 260.

Figures 54, 55:
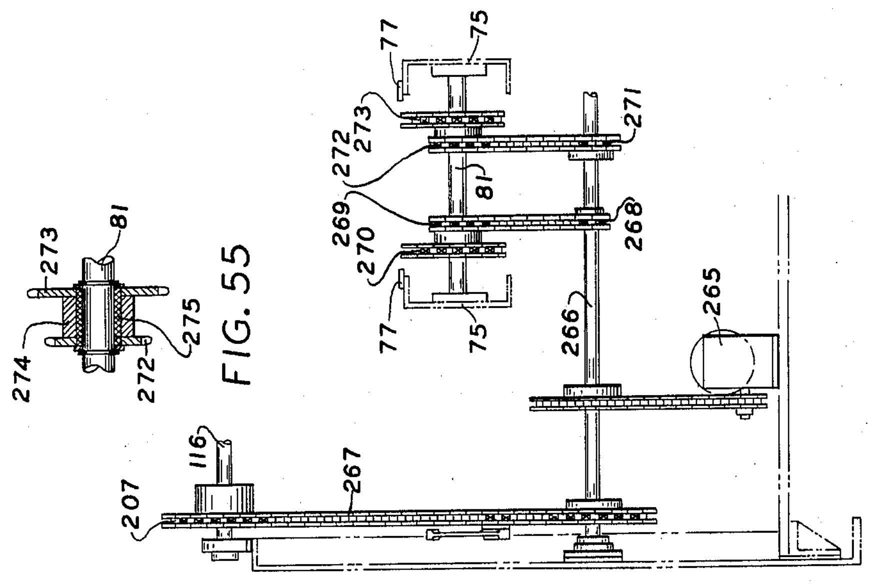
FIG. 54 is a front view of the drive system.
FIG. 55 is a sectional view of a sprocket drive unit.
Figure 53:
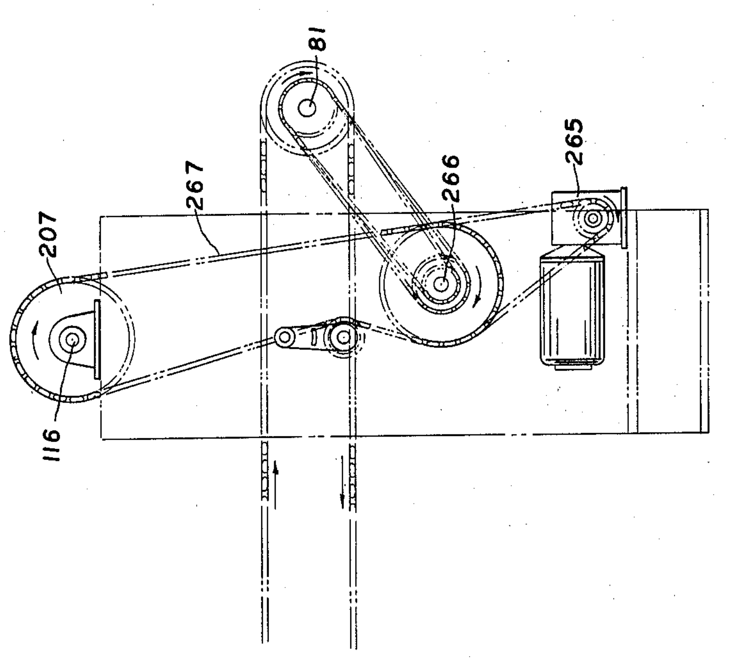
FIG. 53 is a side view of the drive system.

The drive system preferred in the present instance is shown in FIGS. 53, 54, and 55. This system employs a motor-reducer 265 driving a power shaft 266. From power shaft 266 a drive chain or belt 267 transmits power to sprocket 207. Also from shaft 266 the conveyor is driven. From sprocket 268, a sprocket 269 fixed to shaft 81 is driven. Sprocket 269 and sprocket 270 for the slow speed chain 84 are fastened together. In a like manner sprocket 271 is driven from shaft 266 and in turn drives sprocket 272 freely rotatable on shaft 81 and attached to sprocket 273 for a high speed chain 83. In the present instance the combination of sprockets 272 and 273 are fastened to a common hub 274 with a bushing 275 permitting the assembly to rotate at a speed independent of front drive shaft 81.

Figure 59:
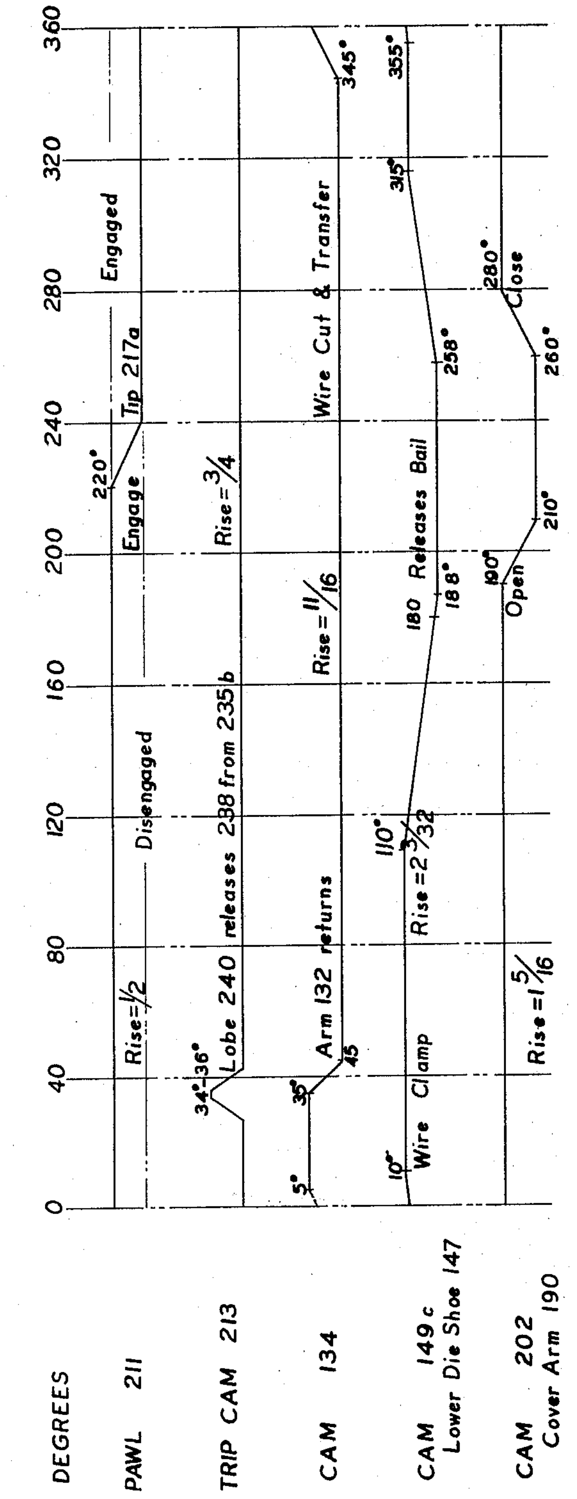
FIG. 59 is an operation diagram of the cams and clutch mechanism.

The relationship between the clutch disengagement and engagement by pawl 211, the hold mechanism controlled by cam 213, and the cams 134, 149c, and 202 is shown in FIG. 59. In this diagram as shown, the zero degree position is in the up position or "top dead center" of the crank 149a, as shown in FIG. 10. As previously outlined, pawl 211 is initially engaged at two hundred twenty degrees and is fully engaged at two hundred forty degrees. The trip cam 213 has lobe 240 contacting trip arm 235 at thirty-four degrees releasing roller pin 238 from detent 237. The lobe 240 starts to fall to the base diameter at thirty-six degrees. In the present instance the rise and fall of lobe 240 is three-quarters of an inch. The cam 134 activating the wire cutting arm 132 has a gradual rise of eleven-sixteenths inches in lobe 133a starting at three hundred forty-five degrees and finishing at five degrees, then dwelling for thirty degrees to thirty-five degrees and then returning to base diameter at forty-five degrees. The wire cutting and transfer performed by arm 132 moving forward takes place in the rise from three hundred forty-five degrees to five degrees. Cam 149c controlling the movement of the lower die shoe 147 has, in the present embodiment, a total rise of two and three thirty-seconds inches. While wire 117 is being cut and transferred, the lower die shoe 147 urged upward by springs 149b is allowed by cam 149c to move upward at ten degrees, where it clamps cut wire 119 (FIG. 20). The lower die shoe 147 dwells from ten to one hundred and ten degrees. It is during this period that upper die shoe 150 moves toward lower die shoe 147 to form the wire into inverted U-shape. The cam 149c does not influence the lower die shoe until, at point one hundred eighty degrees, lobe 257 engages follower 149d. Then lobe 257 pushes lower die shoe 147 further down; and, at one hundred eighty-eight degrees, the bail 121 is released. The lobe 257 holds the lower die shoe in its lowermost position until two hundred fifty-eight degrees. The cam 149c then allows the lower die shoe to return, the position shown in FIG. 18, to base at three hundred fifteen degrees. At three hundred fifty-five degrees the cam 149c starts allowing the movement of the lower die shoe 147 further upward to the position shown in FIG. 20. The cover arms 190 are controlled by cams 202 the lobes of which each have a rise of one and five-sixteenths inches. At one hundred ninety degrees the cover arms 190 are started to move outwards by the start of lobes 202a, the full rise being at two hundred ten degrees. Lobes 202a continue to two hundred sixty degrees when they start to fall, whence the cover arms 190 start to move in. At two hundred eighty degrees the cam has returned to base position and the cover arms 190 are closed.

Figure 57:
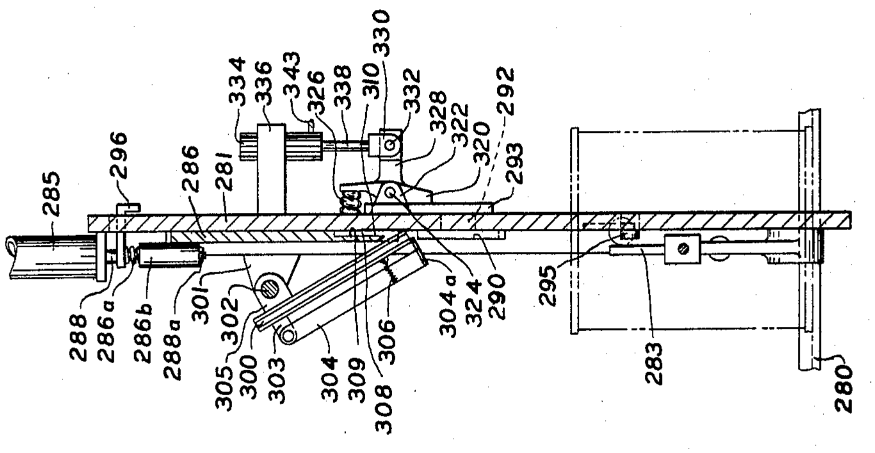
FIG. 57 is a side view thereof.
Figures 56, 58:
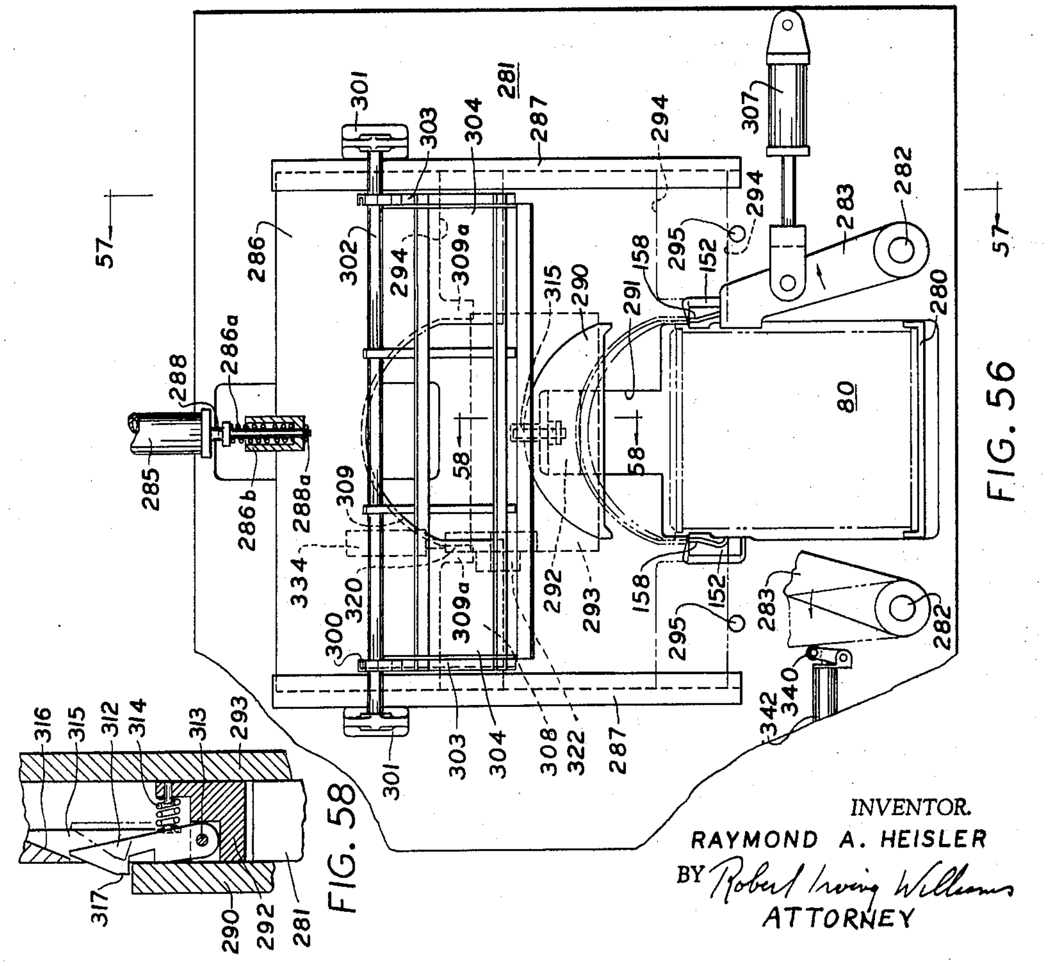
FIG. 56 is a front view of an alternate form of construction.
FIG. 58 is a sectional view on the line 58—58 of FIG. 56.

In certain instances a hand fed apparatus is desired. This apparatus is used to provide the benefits as discussed above, of the bail as formed and inserted by bailing operations not a part of the conveyor system. One arrangement is shown in FIGS. 56, 57, and 58 wherein a slide guide 280 is provided for the reception of a single can 80. The slide guide 280 is mounted on main plate 281. Also pivotally mounted on pins 282 are can locating arms 283 operating similarly to cover stop arms 190. Pins 282 are attached to plate 281.

An air cylinder 285 operates an upper die plate 286 through the medium of a spring 286a carried in a cup 286b fastened to the upper die plate 286. The upper die plate is generally similar to shoe 150 and movable in guides 287. The air cylinder 285 is activated manually by an air valve (not shown), and its piston rod 288 moves downward, exerting downward pressure on the top of spring 286a and thus pushing upper die shoe 286 downwardly thru the medium of spring 286a. Rod 288 carries a cross-piece 288a extending beneath the bottom of the cup 286b when the spring 286a is expanded.

A lower die shoe 290 is similar in shape and function to lower die shoe 147. A vertical slide slot 291 is provided in plate 281 for guide lug 292 to move vertically therein. The guide lug 292 is attached to die shoe 290, and is slightly thicker than plate 281. A back slide plate 293 is attached to guide lug 292 holding the lower die shoe 290 against plate 281. The lower die shoe 290 is spring biased upward similarly to shoe 147 by springs not shown. When the upper die plate 286 reaches the desired lower limit the lower edge 294 of its movement, plate 286 engages stop pins 295 stopping the downward movement of plate 286. The cylinder 285 continues to push downward causing spring 286*a* to be compressed. A finger 296 is attached to piston rod 288 and, as the spring 286*a* is compressed, the finger 296 engages back slide plate 293 and pushes lower die shoe further down to release the bail in a manner to be hereinafter described.

On the face of the apparatus is an embodiment of a wire feed. Wire cut to preselected length, is placed in a chute 300. Chute 300 has the sides so spaced as to retain the wire in a single line. Brackets 301 are attached to main plate 281 and support a bar 302. Arms 303 are fastened on chute 300 and support chute cover 304. Chute 300 is hingedly attached to hinge brackets 305 which permit chute 300 to swing on bar 302. A spring 306 pulls the chute cover over the chute. When the upper die plate 286 is in the position shown, a pre-cut wire drops from the chute 300 onto lower die shoe 290, the space between the lower edge of the chute 300 and the top of the lower die plate being only sufficient for the reception of a single wire. As the upper die plate 286 moves down to form the bail, the chute 300 is moved outward by engagement of the lower edge of plate 286 with the inclined lower end of the chute, moving the chute into the chute cover 304, which has a bottom plate 304*a* which prevents loss of wires in the chute. When the atcivation of the air valve is then halted, the upper die plate returns to its starting point by the action of a spring (not shown) in cylinder 285, and allows the chute 300 to move back into delivery position away from the chute cover 304.

Cover stop arms 283 are moved inwardly by air cylinders 307 operated by the same valve system operating cylinder 285 and positioning the can for the proper insertion of a bail. Of note also is a wire recess 308 formed in upper die plate 286 and also a wire recess 309, formed in the arcuate portion of upper die plate 286. In operation a wire is fed into wire recess 308 when the upper die plate 286 is in the upper position. When air cylinder 285 pushes die plate 286 downward, the chute 300 is pushed outward against the bias of spring 306 leaving a wire in recess 308. Contactors 309*a* depending from die plate 286 then engage the ends of the wire and push the wire over lower die shoe 290 where the wire is bent into an inverted U-form. The lower ends of the wire then enter the groove 158 in curling dies 152 as the plate 286 and the shoe 290 move downwardly.

It is of note that the covering of the dies 152 as shown in FIG. 56 is by means of upper die plate 286 rather than by stop arms 283. The covering of the dies 152 is by the forward surface 310 of the recess 308 shown in FIG. 57. When the upper die plate 286 reaches the lowest position, indicated by phantom outline, against stops 295, the dies 152 are covered by surface 310, providing a passage for the ends of the wire to be made into loops. Arms 283 provide stops for the ears on the can 80.

To facilitate removal of the bailed can from the apparatus there is provided means for release of the bail and other attendant motions. Moving with lower die shoe 290 is an ejector finger 312, pivotally mounted in guide lug 292 by pin 313 and urged forwardly by a spring 314. Ejector finger 312, in the up position, is behind plate 281. As the lower die shoe 290 moves downward, the upper portion of finger 312 enters a slot 315 in plate 281 and, controlled by slope surface 316, is allowed to move forward under influence of spring 314. A contact surface 317 on the finger 312 will engage the bail and attempt to push the bail forward. However, until the bail is freed, the finger will apply pressure but will not be able to push the bail forward. When the die shoe 290 reaches the lowermost point, as pushed by the finger 296, the upper edge of back slide plate 293 moves under a lock arm 320, holding the lower die shoe 290 in the down position. A bracket 322 is attached to plate 281 and pivotally supports lock arm 320 by means of a pin 324. A spring 326 is mounted so as to engage and urge the lock arm 320 above the back slide plate 293.

To release the bail, the manual operation of the valve controlling the actuation of cylinders 285 and 307 is terminated, causing the piston rods to move into the cylinders. The upper die plate is drawn upwardly by the cross-piece 288*a* on rod 288, and the arms 283 are drawn outwardly by cylinder 307. A very short outward movement of arms 283 releases the ears of the can, and, when lower edge 294 of upper plate 286 reaches the upper edges of the dies 152, the bail is released and the spring biased finger 312 moves forward pushing the bail forward. The can 80 can then be moved out of the apparatus. To release the lower die shoe 290 so as to return to the up position, the lock arm 320 must be released from engagement with back slide plate 293. An arm 328 is attached to lock arm 320. A clevis 330 is attached to arm 328 by means of a pin 332. A cylinder 334 is mounted in a bracket 336 and the piston rod 338 is attached to clevis 330. A valve lever 340 (FIG. 56) is mounted on a valve 342 in such a manner that an arm 283, when moved to the open position, activates the valve lever 340, in turn opening valve 342 in an air line 343, causing cylinder 334 to retract, moving rod 338 upwards and causing the lock arm 320 to disengage from plate 293. As the die shoe 290 moves upward the finger 312 will engage the slope surface 316 and move back to the position shown in phantom outline whence contact surface 317 will be behind the face of plate 281. The apparatus will then be ready to receive a new can for bailing as above. When the arms 283 move inwardly, the lever 340 is released, closing the valve 242, and relieving the upward pressure on rod 338 by cylinder 334, which is vented sufficiently to relieve the pressure therein when the valve 242 is closed.

Since certain changes may be made in the above constructions and in the above processes and different embodiments of the invention can be made without departing from the scope thereof, it is intended that all matters contained in the above disclosure or shown in the acompanying drawings be interpreted as illustrative and not in a limiting sense.

I claim:

1. Apparatus for providing eared cans with bails comprising means to transport eared cans forwardly along a path in an upright position, said means exerting a greater forward propulsive force on the portion of such a can which at any one time is at one side of the path than on the opposite portion of the can to induce a rotation of such cans, a guide bar for one side of such path and disposed at a height such that a can ear at such height will contact said bar to limit the rotation of the can, a guide bar at a different height for the other side of such path, means at the first-mentioned height on said other side for detecting the presence of an ear on that side, means for inserting the ends of a bail into the ears of a can, and means for operating said inserting means in response to the operation of said detecting means.

2. Apparatus as in claim 1 wherein there is provided also means for forming a bail and wherein said forming means is operated in response to the operation of said detecting means and prior to the operation of said inserting means.

3. Apparatus as in claim 1 wherein means are provided for spacing cans transported by said transporting means.

4. Apparatus as in claim 1 wherein said transporting means comprises a pair of laterally-spaced conveying means.

5. Apparatus as in claim 1 wherein the first-mentioned guide bar terminates in advance of said inserting means a distance just sufficient for the can to be rotated enough so that when it reaches said inserting means the line between the ears thereof will be substantially perpendicular to said path.

6. Apparatus for providing containers with bails, comprising bail applying mechanism, means to conduct containers to and beyond said mechanism, means to space containers on said conducting means, means for detecting the presence and absence of an ear in a given position on a container which is being moved by said conducting means toward said bail applying mechanism, said ear detecting means including means responsive to the detecting of an ear for initiating the operation of said bail applying mechanism means to stop a container in a given relationship to said mechanism for the application of a bail thereto by said mechanism, and means responsive to the operation of said mechanism to release a container to which a bail has been applied.

7. Apparatus for providing eared cans with bails, comprising bail-applying mechanism, a pair of spaced conveyor strands adapted to support cans on their bottoms and convey them along a path to said mechanism, means to move one of said strands at a greater speed than the other of said strands to induce rotation of the cans as they are conveyed, a guide bar on one side of such path positioned to be contacted by a can ear during the rotation of a can to restrain further rotation, and conveying mechanism for smaller cans and disposed between and below said strands.

8. Mechanism for forming and inserting wire bails into the ears of eared cans, comprising bending dies having wire-engaging portions in a single plane, means to feed wire into position in said plane between said bending dies, means to move at least one bending die toward the other in said plane to shape said wire into a bail, a pair of die means providing guideways substantially in said plane to conduct the ends of the bail from the bail-end-receiving entrance portions thereof into the ears of a can, means to mount said die means for movement of the exit portions of the guideways toward and away from the ears of a can on axes near said entrance portions, and means to move the ends of the bail into, thru, and out of said guideways while maintaining said die means with their inner edges in contact with the respective ears, said guideways being curved to curve the ends of the bail to insert them in the ears of a can.

9. Mechanism as in claim 8 wherein said feeding means is arranged to feed from a storage supply of precut lengths of substantially straight wire into position.

10. Mechanism as in claim 8 wherein means are provided for feeding from a storage supply substantially straight precut wire lengths one-by-one between said bending dies from a position lateral of said plane.

11. Apparatus for providing eared cans with bails comprising ear-contacting mechanism for alining the ears of a can for the insertion into said ears of the ends of a bail, means for forming a wire into the shape of a U, means for shaping each of the ends into curved loops and inserting said ends while essentially maintaining all parts of the wire in a single plane during such forming, shaping, and inserting operations, and means for the movement of the ear-contacting mecahnism out of ear-contacting position after said bail is applied.

12. Mechanism for inserting wire-ends into oppositely alined ears on a can, comprising a pair of spaced die means formed at the facing edges thereof with ear-receiving recesses, and means to move said facing edges of said die means toward and away from each other, each die means being formed with a guideway for a wire-end which guideway begins at the rearward edge of its die means and for a distance extends generally forwardly and thence curves outwardly away from said facing edge of its die means and then curves inwardly toward and to the recess of the die means having the guideway, the radius of the arc of the curve of said guideway decreasing as the curve approaches said recess.

13. Mechanism for inserting wire bails into the ears of eared cans, comprising a pair of die means providing guideways to conduct the ends of a bail inwardly into the ears of a can, each of said guideways having a rearward bail-end receiving portion and a portion formed in a curve wihch terminates in an arc at the inward exit edge of the die to provide an exit opening at a forward point, the center of the arc being located forwardly with respect to said receiving portion and rearwardly with respect to said exit opening at a distance in from said exit edge.

14. Mechanism for inserting wire bails into the ears of eared cans, comprising a pair of die means providing guideways to conduct the ends of a bail into the ears of a can disposed between inwardly-facing edges of the die means, the respective guideways having bail-end receiving entrance portions, respectively diverging portions and portions extending in mutually converging curves to said edges, means to pivotally mount each of said die means at a pivot point adjacent to the receiving portion of the guideways, and means to push the ends of a bail into said guideways and along the diverging portions thereof to swing said dies about said pivot points so that said edges of the dies will move toward each other until said edges abut the ears of the can during the movement of the bail ends thru said guideways and into the openings in the ears of a can.

15. Mechanism for inserting wire bails into the ears of eared cans, comprising a pair of die plates each having in a face thereof a groove providing a guideway to conduct an end of a bail into an ear of a can, at least one side wall of said groove at any particular part thereof being formed to slope outwardly away from a central plane disposed perpendicularly to the plane of said face, and a cover plate for said face of each die.

16. Mechanism as in claim 15 wherein said groove is curved first in one direction and then in the other and wherein said outwardly-sloped walls are provided at the inside of said curves.

17. Mechanism for forming and inserting wire bails into the ears of eared cans comprising upper and lower bending dies having wire engaging portions in a generally vertical plane, means to feed wire into position in said plane between said bending dies, means to move at least one bending die toward the other in said plane to shape said wire into a bail, a pair of guide means providing guideways for forming the ends of the wire into loops and for conducting and inserting said ends into the ears of a can while essentially maintaining all parts of the wire in a single plane during such forming, shaping, conducting and inserting operations, means to move said bending dies in one direction in said plane to move the ends of the bail into, through, and out of said guideways, means for moving one of said bending dies away from the other in said plane, means for moving the central portion of said bail out of said plane, and means for thereupon moving the said dies in a direction opposite to the aforesaid direction in said plane.

18. Mechanism for the transporting and orienting of cans with ears and for making, shaping and inserting of wire bails, comprising:

(a) means for receiving, conveying and feeding eared cans, (b) means for causing only cans having a pair of oppositely disposed ears to be successively oriented with said pair of oppositely-disposed ears in a given line, (c) means for detecting the presence of one of said ears when the ears lie in said line, and (d) means operative in response to the operation of said detecting means and in a single plane for cutting and shaping wire into a bail in said plane and inserting the ends of the bail into the ears of a can with said ends in said plane.

19. Mechanism as in claim 18 wherein there are provided a pair of die means providing guideways for the ends of a bail as they are moved toward and inserted into the ears of a can, the respective guideways having bail-end receiving portions and portions extending in converging curves which terminate at points nearer the first-mentioned portions than the center of the curves at their points of termination.

20. Mechanism for the transporting and orienting of cans with ears and for making, shaping and inserting of wire bails, comprising:

(a) means for receiving, conveying and feeding eared cans, (b) means for causing only cans having a pair of oppositely disposed ears to be successively oriented with said pair of oppositely disposed ears in a given line, (c) means for detecting the presence of one of said ears when the ears lie in said line, (d) means responsive to the operation of the detecting means for causing a signal to be generated, transferred and received, (e) means to cut and shape wire into a bail and insert the bail into the ears of the can, (f) means to actuate the last-mentioned means, (g) means for translating the received signal into mechanical motion of said actuating means, (h) and means for mechanically preventing the operation of said translating means until the signal is received.

21. Apparatus as in claim 20 wherein the means (g) for translating the received signal into mechanical motion includes:

a rotatable shaft, a keyway formed in said shaft, a pawl carried in said keyway, a rotating clutch on said shaft with means adapted to be engaged by said pawl, a spring urging said pawl into engagement with said clutch, a pivotally-mounted pawl-engaging arm, cooperating means on said pawl and said arm to move the pawl against the urging of said spring, spring means urging said pawl-engaging arm into engagement with said pawl, signal operated means to move the pawl-engaging arm out of engagement with said pawl;

and the means (h) for mechanically preventing the operation of said translating means includes:

a pivotally-mounted trip element, a holding means formed on said trip element, a spring urging said trip element into holding position, a lock element arranged to engage the holding means in the trip element when the trip element is in said position, means operated by said signal-operated means for moving said lock element into engagement with said holding means, means preventing the movement of said pawl-engaging arm into engagement with said pawl while said lock element is in engagement with the holding means, and rotary cam means on said shaft to move said trip element so as to release said holding means from the lock element.

22. Mechanism for the transporting and orienting of eared cans and for making, shaping and inserting of wire bails, comprising:

(a) means for receiving, conveying, and feeding eared cans in an upright position along a path in a spaced relationship, (b) means for causing the cans to rotate on a vertical axis upon said conveying means, (c) means disposed laterally of said path to guide each side of the eared cans along said path, (d) an ear guide bar mounted in fixed relationship to one of said guide means and disposed at a height such that a can ear at such height will contact said bar to limit the rotation of the can, the guide bar being further located in such relationship to said one of said guide means as to avoid contact of the guide bar with the side of a can as it is advanced along said path, (e) means for detecting the presence of an ear on the side opposite the ear guide bar, and (f) means responsive to the operation of said detecting means and operative in a single plane for cutting and shaping wire into a bail in said plane and inserting the ends of the bail into the ears of a can with said ends in said plane.

23. Apparatus as set forth in claim 1 wherein said transporting means comprises a pair of spaced conveyor strands and wherein there is also provided conveying mechanism for smaller cans and disposed between and below said strands.

24. Mechanism for forming and inserting wire bails from a longer wire and inserting them into the ears of eared cans, comprising bending dies having wire-engaging portions in a single plane, a wire guiding groove adjacent to said plane, means to feed wire into said groove, means for cutting said wire including a pair of die blocks precisely positioned adjacent to said groove, a pair of wire cutting members movable toward the die blocks, means for moving said cutting members toward the die blocks to cut the wire in the groove at two points to provide a wire of accurately predetermined length, means to move the cut wire from said groove into position in said plane between said bending dies, means to move at least one bending die toward the other in said plane to shape said wire into a bail, a pair of die means providing guideways to conduct the ends of the bail into the ears of a can, and means to move the ends of the bail into, thru, and out of said guideways, said guideways being curved to curve the ends of the bail to insert them in the ears of a can.

References Cited by the Examiner

UNITED STATES PATENTS

| | | | |
|---|---|---|---|
| 1,129,919 | 3/1915 | Swift | 140—75 |
| 1,305,461 | 6/1919 | Gooding | 192—25 |
| 1,833,795 | 11/1931 | Renshaw | 140—93 |
| 1,947,472 | 2/1934 | Hoover | 140—93 |
| 1,999,192 | 4/1935 | Holloway | 140—93 |
| 2,122,082 | 6/1938 | Bertram | 140—75 |
| 2,275,758 | 3/1942 | Harris | 192—25 |
| 2,325,102 | 7/1943 | Boschen | 192—25 |
| 2,518,492 | 4/1950 | Reese | 192—25 |
| 2,657,784 | 11/1953 | Stoker | 198—21 |
| 2,681,130 | 6/1954 | Atwood | 198—21 |
| 3,078,882 | 2/1963 | Simon | 140—93 |

WHITMORE A. WILTZ, *Primary Examiner.*

CHARLES W. LANHAM, *Examiner.*